US012627990B2

(12) United States Patent
Zhang et al.

(10) Patent No.: US 12,627,990 B2
(45) Date of Patent: May 12, 2026

(54) UE CAPABILITY INFORMATION PROCESSING METHOD AND APPARATUS, DEVICE, AND STORAGE MEDIUM

(71) Applicant: DATANG MOBILE COMMUNICATIONS EQUIPMENT CO., LTD., Beijing (CN)

(72) Inventors: Bufang Zhang, Beijing (CN); Meng Xu, Beijing (CN); Jing Liang, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 373 days.

(21) Appl. No.: 18/260,781

(22) PCT Filed: Jan. 6, 2022

(86) PCT No.: PCT/CN2022/070514
§ 371 (c)(1),
(2) Date: Jul. 7, 2023

(87) PCT Pub. No.: WO2022/148398
PCT Pub. Date: Jul. 14, 2022

(65) Prior Publication Data
US 2024/0056825 A1 Feb. 15, 2024

(30) Foreign Application Priority Data

Jan. 8, 2021 (CN) .......................... 202110024367.7

(51) Int. Cl.
*H04W 16/10* (2009.01)
*H04W 8/22* (2009.01)
(52) U.S. Cl.
CPC ............. *H04W 16/10* (2013.01); *H04W 8/22* (2013.01)

(58) Field of Classification Search
CPC ............. H04B 7/0628; H04B 7/06964; H04W 36/0085; H04W 8/22; H04W 16/10; H04W 36/0069; H04W 76/15; H04W 8/24
See application file for complete search history.

(56) References Cited

U.S. PATENT DOCUMENTS 11,395,303 B2 * 7/2022 Yi .......................... H04L 5/0044
2016/0219604 A1 * 7/2016 Fujishiro ............... H04W 76/15
(Continued)

FOREIGN PATENT DOCUMENTS

CN 111225396 A 6/2020
CN 111526566 A 8/2020
(Continued)

OTHER PUBLICATIONS

ZTE Corporation et al., "On MR-DC configuration with resume procedure", 3GPP TSG RAN WG2 Meeting #107, Prague, Czech Republic, Aug. 26-30, 2019, total 4 pages, R2-1910751.
(Continued)

*Primary Examiner* — Congvan Tran
(74) *Attorney, Agent, or Firm* — KILPATRICK TOWNSEND & STOCKTON LLP

(57) ABSTRACT

Provided are a UE capability information processing method and apparatus, a device, and a storage medium. The method comprising: reporting first capability information to a network side device; the first capability information being UE capability information associated with a SCG deactivate state (101); receiving, from the network-side device, first configuration information for instructing a UE to perform a configuration associated with the SCG deactivate state (102); and performing the configuration associated with the SCG deactivate state (103). By defining the UE capability associated to the SCG deactivate state in multiple connection scenarios, when the network side is performing an
(Continued)

Reporting first capability information to a network side device, where the first capability information is UE capability information associated with a secondary cell group (SCG) deactivated state ~ 101

Receiving first configuration information transmitted from the network side device, where the first configuration information is used to indicate the UE to perform configuration associated with the SCG deactivated state ~ 102

Performing the configuration associated with the SCG deactivated state ~ 103 operation or configuration corresponding to the SCG deactivate state, on the basis of the corresponding UE capability, the network side may decide whether to perform or how to implement the corresponding operation or configuration, to ensure that when no data transmission exists on the SCG side, the SCG is suspended to conserve energy, and when needed, the SCG can be quickly activated to perform normal data transmission.

26 Claims, 2 Drawing Sheets

(56) References Cited

U.S. PATENT DOCUMENTS

| | | | |
|---|---|---|---|
| 2018/0255512 A1 | 9/2018 | Lee et al. | |
| 2019/0053193 A1* | 2/2019 | Park | H04W 74/004 |
| 2019/0253908 A1* | 8/2019 | Fan | H04W 24/10 |
| 2020/0267631 A1* | 8/2020 | Yilmaz | H04W 48/20 |
| 2022/0046522 A1* | 2/2022 | Kim | H04W 48/16 |
| 2022/0070788 A1* | 3/2022 | Wu | H04W 48/02 |
| 2022/0132333 A1* | 4/2022 | Mattam | H04L 5/0035 |
| 2023/0239892 A1* | 7/2023 | Wang | H04W 52/146 |
| | | | 370/329 |
| 2023/0362817 A1* | 11/2023 | Da Silva | H04W 24/10 |
| 2024/0129991 A1* | 4/2024 | Kim | H04W 24/08 |
| 2024/0422575 A1* | 12/2024 | Wu | H04W 36/008355 |

FOREIGN PATENT DOCUMENTS

| | | |
|---|---|---|
| CN | 111543117 A | 8/2020 |
| WO | 2020167169 A1 | 8/2020 |

OTHER PUBLICATIONS

Catt,"Efficient Activation/Deactivation Mechanism for SCG", 3GPP TSG-RAN WG2 Meeting #112 electronic, Online, Nov. 2-13, 2020, total 4 pages, R2-2009357.

Office Action of Corresponding Cn Patent Application No. 202110024367.7.

Huawei et al., "Remaining issues on UE capability for eDCCA RAN2 features", 3GPP TSG-RAN WG2#110-e, Jun. 1-12, 2020, total 3 pages, R2-2005238.

European Patent Office, Extended European Search Report Issued in Application No. 22736560.3, Nov. 4, 2024, Germany, 13 pages.

Qualcomm Incorporated, "UE capability of Rel-16 DCCA enhancement", 3GPP TSG RAN WG2 Meeting #109-e, E-Conference, Feb. 24-28, 2020, total 6 pages, R2-2000135.

Huawei et al., "UE capabilities for DC and CA enhancements", 3GPP TSG-RAN WG2 Meeting#107bis, Chongqing, China, Oct. 14-18, 2019, total 9 pages, R2-1913616.

Huawei et al., "UE capabilities for DC and CA enhancements", 3GPP TSG-RAN WG2 Meeting#108, Reno, USA, Nov. 18-22, 2019, total 25 pages, R2-1914684.

* cited by examiner

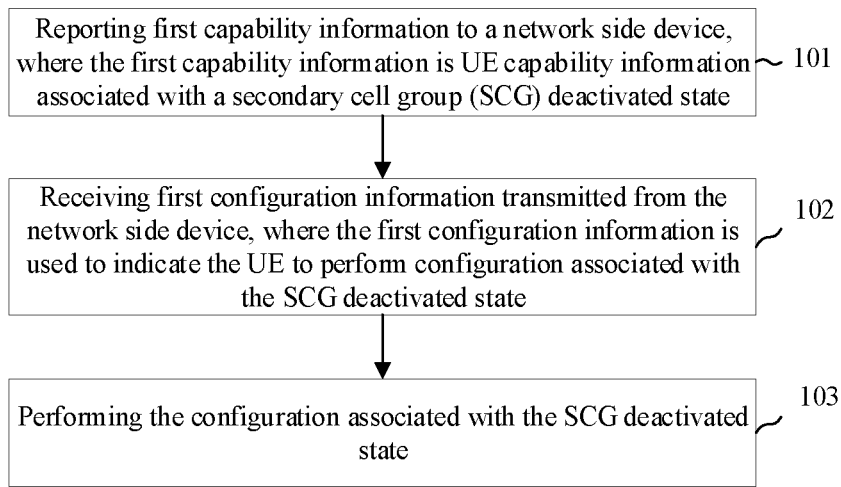

Reporting first capability information to a network side device, where the first capability information is UE capability information associated with a secondary cell group (SCG) deactivated state ～ 101

Receiving first configuration information transmitted from the network side device, where the first configuration information is used to indicate the UE to perform configuration associated with the SCG deactivated state 102

Performing the configuration associated with the SCG deactivated state 103

FIG. 1

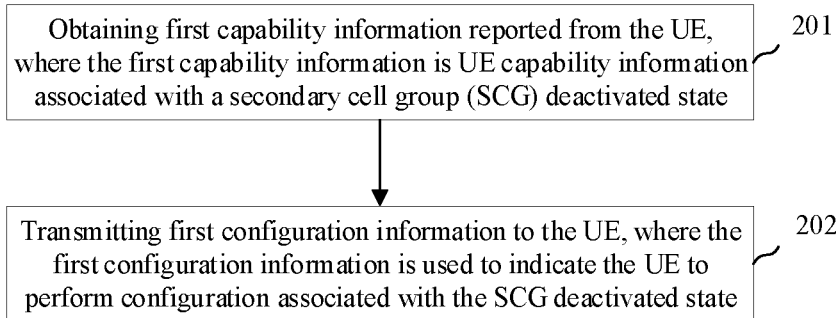

Obtaining first capability information reported from the UE, where the first capability information is UE capability information associated with a secondary cell group (SCG) deactivated state 201

Transmitting first configuration information to the UE, where the first configuration information is used to indicate the UE to perform configuration associated with the SCG deactivated state 202

FIG. 2

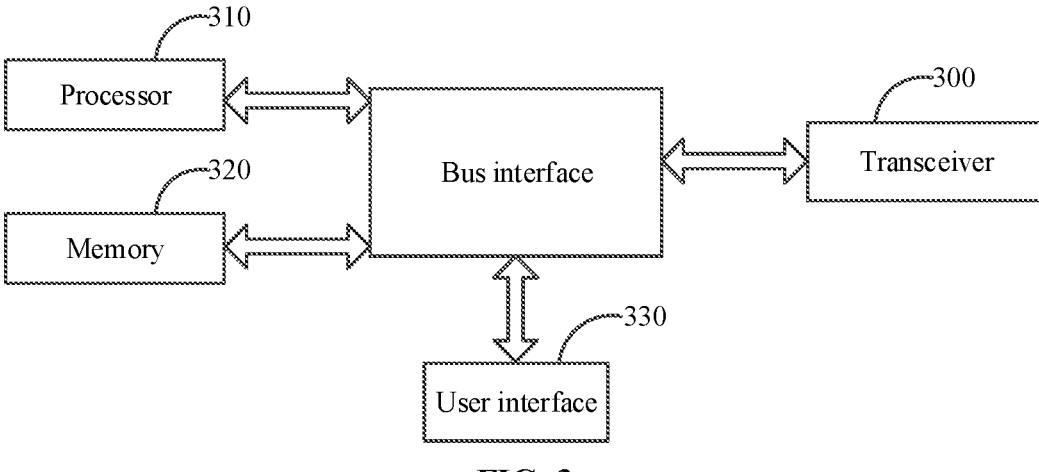

310

Processor

320

Memory

Bus interface

300

Transceiver

330

User interface

FIG. 3

UE CAPABILITY INFORMATION PROCESSING METHOD AND APPARATUS, DEVICE, AND STORAGE MEDIUM

CROSS-REFERENCE TO RELATED APPLICATION

The present application is a National Stage of International Application No. PCT/CN2022/070514, filed on Jan. 6, 2022, which claims priority to Chinese Patent Application No. 202110024367.7 filed on Jan. 8, 2021, entitled "UE Capability Information Processing Method and Apparatus, Device, and Storage Medium", which are hereby incorporated by reference in their entireties.

FIELD

The present application relates to the field of communication, and in particular, to methods and apparatuses for processing user equipment (UE) capability information, devices and a storage medium.

BACKGROUND

A secondary cell group (SCG) deactivated state is introduced into a new radio (NR) and is also referred to as an SCG dormant state or an SCG suspended state or a primary secondary cell (PSCell)/an SCG primary cell suspended or dormant state or a PSCell deactivated state, etc., For infrequent large data flows, in case that no larger data packet transmission or no data transmission on the SCG side occurs, the SCG is suspended, that is, both the UE and the network side device save SCG contexts, but some actions are suspended, for example, the UE stops monitoring the physical downlink control channel (PDCCH) from the SCG side, the UE does not monitor the SCG channel, and the UE stops data transmission to the SCG side, etc., which save UE power consumption. In case that a larger data flow interaction occurs or data transmission occurs on the SCG side, the SCG of the UE is quickly activated for data transmission.

However, whether UE supports SCG deactivated state and UE capabilities associated with the SCG deactivated state are still unclear. In a multi-connectivity scenario, how to assist the network side device to configure, based on UE capabilities associated with the SCG deactivated state, the SCG deactivated state or operations associated with the SCG deactivated state for the UE is an urgent problem that needs to be solved.

SUMMARY

Embodiments of the present application provide methods and apparatuses for processing user equipment (UE) capability information, devices and a storage medium, which may solve a problem of UE capabilities associated with the SCG deactivated state are not clear.

An embodiment of the present application provides a method for processing UE capability information, including:

reporting first capability information to a network side device, where the first capability information is UE capability information associated with a secondary cell group (SCG) deactivated state;

receiving first configuration information transmitted from the network side device, where the first configuration information is used to indicate the UE to perform configuration associated with the SCG deactivated state; and performing the configuration associated with the SCG deactivated state.

According to the method for processing the UE capability information provided by an embodiment of the present application, before reporting the first capability information to the network side device, the method further includes:

obtaining a capability request message transmitted from the network side device, where the capability request message includes first indication information for indicating the UE to report the first capability information.

According to the method for processing the UE capability information provided by an embodiment of the present application, the first capability information includes at least one of the followings:

whether the UE supports a capability associated with the SCG deactivated state;

whether the UE supports a capability associated with SCG state transition;

whether the UE supports a capability associated with performing channel state information reference signal (CSI-RS) measurement and reporting in case that the SCG is in a deactivated state;

whether the UE supports a capability associated with performing radio resource management (RRM) measurement and reporting in case that the SCG is in a deactivated state;

whether the UE supports a capability associated with performing radio link monitoring (RLM) measurement and radio link failure (RLF) reporting in case that the SCG is in a deactivated state;

whether the UE supports a capability associated with performing beam management in case that the SCG is in a deactivated state;

whether the UE supports a capability associated with performing sounding reference signal (SRS) transmission in case that the SCG is in a deactivated state;

whether the UE supports a capability associated with maintaining an uplink timing advance (TA) value in case that the SCG is in a deactivated state;

whether the UE supports a capability to directly configure the SCG to be in a deactivated state; or whether the UE supports a capability associated with performing reconfiguration in case that the SCG is in a deactivated state.

According to the method for processing the UE capability information provided by an embodiment of the present application, the first capability information is distinguished by at least one of the followings:

bands supported by the UE;

band combinations supported by the UE;

duplex modes supported by the UE;

transmission frequency ranges supported by the UE;

types of radio access networks supported by the UE;

types of multi-connectivity network architectures supported by the UE;

types of radio access networks for a master node (MN) supported by the UE; or types of radio access networks for a secondary node (SN) supported by the UE.

According to the method for processing the UE capability information provided by an embodiment of the present application, the first capability information includes at least one type of indication information for the capability associated with SCG state transition, where the indication information includes at least one of the followings:

whether the UE supports performing the SCG state transition through a medium access control layer control element (MAC CE);

whether the UE supports performing the SCG state transition through downlink control information (DCI);

whether the UE supports performing the SCG state transition through radio resource control (RRC);

whether the UE supports performing the SCG state transition through a timer.

According to the method for processing the UE capability information provided by an embodiment of the present application, the first capability information includes at least one type of indication information for the capability associated with performing CSI-RS measurement and reporting in case that the SCG is in the deactivated state, where the indication information includes at least one of the followings:

whether the UE supports periodically reporting CSI-RS measurement results through an MN side in case that the SCG is in the deactivated state;

whether the UE supports semi-persistently reporting CSI-RS measurement results through an MN side in case that the SCG is in the deactivated state;

whether the UE supports aperiodically reporting CSI-RS measurement results through an MN side in case that the SCG is in the deactivated state; or whether the UE supports reporting CSI-RS measurement results through a pre-configured SCG resource in case that the SCG is in the deactivated state.

According to the method for processing the UE capability information provided by an embodiment of the present application, the first capability information includes at least one type of indication information for the capability associated with performing RRM measurement and reporting in case that the SCG is in the deactivated state, where the indication information includes at least one of the followings:

whether the UE supports performing RRM measurement in case that the SCG is in the deactivated state;

whether the UE supports performing relaxed RRM measurement in case that the SCG is in the deactivated state;

whether the UE supports performing RRM measurement based on measurement configuration configured on an SCG side in case that the SCG is in the deactivated state; or whether the UE supports performing relaxed RRM measurement based on measurement configuration configured on an SCG side in case that the SCG is in the deactivated state.

According to the method for processing the UE capability information provided by an embodiment of the present application, the first capability information includes at least one type of indication information for the capability associated with performing RLM measurement and RLF reporting in case that the SCG is in the deactivated state, where the indication information includes at least one of the followings:

whether the UE supports performing RLM measurement in case that the SCG is in the deactivated state;

whether the UE supports performing RLF reporting in case that the SCG is in the deactivated state; or whether the UE supports performing RLM measurement and RLF reporting in case that the SCG is in the deactivated state.

According to the method for processing the UE capability information provided by an embodiment of the present application, the first capability information includes at least one type of indication information for the capability associated with performing beam management in case that the SCG is in the deactivated state, where the indication information includes at least one of the followings:

whether the UE supports performing primary secondary cell (PSCell) beam measurement and reporting in case that the SCG is in the deactivated state;

whether the UE supports performing PSCell beam failure detection in case that the SCG is in the deactivated state;

whether the UE supports performing PSCell beam failure recovery in case that the SCG is in the deactivated state;

whether the UE supports performing SCG secondary cell (SCell) beam measurement and reporting in case that the SCG is in the deactivated state;

whether the UE supports performing SCG SCell beam failure detection in case that the SCG is in the deactivated state; or whether the UE supports performing SCG SCell beam failure recovery in case that the SCG is in the deactivated state.

According to the method for processing the UE capability information provided by an embodiment of the present application, the first capability information includes at least one type of indication information for the capability associated with performing SRS transmission in case that the SCG is in the deactivated state, where the indication information includes at least one of the followings:

whether the UE supports performing SRS transmission in case that the SCG is in the deactivated state; or whether the UE supports performing relaxed SRS transmission in case that the SCG is in the deactivated state.

According to the method for processing the UE capability information provided by an embodiment of the present application, the first capability information includes at least one type of indication information for the capability associated with maintaining an uplink TA value in case that the SCG is in the deactivated state, where the indication information includes at least one of the followings:

whether the UE supports maintaining the uplink TA value in case that the SCG is in the deactivated state; or whether the UE supports running a temporary uplink timing advance timer (TAT) in case that the SCG is in the deactivated state.

According to the method for processing the UE capability information provided by an embodiment of the present application, the first capability information includes at least one type of indication information for the capability to directly configure the SCG to be in the deactivated state, where the indication information includes at least one of the followings:

whether the UE supports directly configuring the SCG to be in the deactivated state in case of performing SCG addition;

whether the UE supports directly configuring the SCG to be in the deactivated state in case of performing SCG reconfiguration;

whether the UE supports directly configuring the SCG to be in the deactivated state in case of performing conditional PSCell addition;

whether the UE supports directly configuring the SCG to be in the deactivated state in case of performing PSCell change;

whether the UE supports directly configuring the SCG to be in the deactivated state in case of performing reconfiguration with sync of PSCell;

whether the UE supports directly configuring the SCG to be in the deactivated state in case of performing conditional PSCell change;

whether the UE supports directly configuring the SCG to be in the deactivated state in case of performing RRC connection resume;

whether the UE supports directly configuring the SCG to be in the deactivated state in case of performing primary cell (PCell) handover; or whether the UE supports directly configuring the SCG to be in the deactivated state in case of performing reconfiguration with sync of PCell.

According to the method for processing the UE capability information provided by an embodiment of the present application, the first capability information includes at least one type of indication information for the capability associated with performing reconfiguration in case that the SCG is in the deactivated state, where the indication information includes at least one of the followings:

whether the UE supports performing SCell addition in case that the SCG is in the deactivated state;

whether the UE supports performing SCell release in case that the SCG is in the deactivated state;

whether the UE supports performing SCell reconfiguration in case that the SCG is in the deactivated state;

whether the UE supports performing PSCell change in case that the SCG is in the deactivated state;

whether the UE supports performing reconfiguration with sync of PSCell in case that the SCG is in the deactivated state;

whether the UE supports performing conditional PSCell change in case that the SCG is in the deactivated state;

whether the UE supports performing SCG release in case that the SCG is in the deactivated state;

whether the UE supports performing SCG reconfiguration in case that the SCG is in the deactivated state;

whether the UE supports performing PCell handover in case that the SCG is in the deactivated state; or whether the UE supports performing reconfiguration with sync of PCell in case that the SCG is in the deactivated state.

According to the method for processing the UE capability information provided by an embodiment of the present application, the performing the configuration associated with the SCG deactivated state includes at least one of the followings:

configuring the SCG to be in the deactivated state;

configuring a state transition of the SCG;

performing configuration associated with CSI-RS measurement and reporting in case that the SCG is in the deactivated state;

performing configuration associated with RRM measurement and reporting in case that the SCG is in the deactivated state;

performing configuration associated with RLM measurement and RLF reporting in case that the SCG is in the deactivated state;

performing configuration associated with beam management in case that the SCG is in the deactivated state;

performing configuration associated with SRS transmission in case that the SCG is in the deactivated state;

performing configuration associated with maintaining an uplink TA value in case that the SCG is in the deactivated state;

performing configuration for directly configuring the SCG to be the deactivated state; or performing configuration associated with reconfiguration in case that the SCG is in the deactivated state.

According to the method for processing the UE capability information provided by an embodiment of the present application, the configuring the state transition of the SCG includes at least one of the followings:

configuring the state of the SCG to transition from an activated state to a deactivated state; or configuring the state of the SCG to transition from a deactivated state to an activated state.

The first configuration information includes at least one of the followings:

medium access control layer control element (MAC CE);

downlink control information (DCI);

radio resource control (RRC).

According to the method for processing the UE capability information provided by an embodiment of the present application, the configuring the state transition of the SCG includes:

starting a first timer, and configuring the state of the SCG to transition from the deactivated state to the activated state; or starting a second timer, and configuring the state of the SCG to transition from the activated state to the deactivated state.

According to the method for processing the UE capability information provided by an embodiment of the present application, the performing configuration associated with the CSI-RS measurement and reporting in case that the SCG is in the deactivated state includes at least one of the followings:

periodically reporting CSI-RS measurement results through an MN side in case that the SCG is in the deactivated state;

semi-persistently reporting CSI-RS measurement results through an MN side in case that the SCG is in the deactivated state;

aperiodically reporting CSI-RS measurement results through an MN side in case that the SCG is in the deactivated state; or reporting CSI-RS measurement results through a preconfigured SCG resource in case that the SCG is in the deactivated state.

According to the method for processing the UE capability information provided by an embodiment of the present application, the performing configuration associated with the RRM measurement and reporting in case that the SCG is in the deactivated state includes at least one of the followings:

performing the RRM measurement and reporting in case that the SCG is in the deactivated state;

performing relaxed RRM measurement in case that the SCG is in the deactivated state;

performing RRM measurement based on measurement configuration configured on an SCG side in case that the SCG is in the deactivated state; or performing relaxed RRM measurement based on measurement configuration configured on an SCG side in case that the SCG is in the deactivated state.

According to the method for processing the UE capability information provided by an embodiment of the present application, the performing configuration associated with RLM measurement and RLF reporting in case that the SCG is in the deactivated state includes at least one of the followings:

performing RLM measurement in case that the SCG is in the deactivated state;

performing RLF reporting in case that the SCG is in the deactivated state; or performing RLM measurement and the RLF reporting in case that the SCG is in the deactivated state.

According to the method for processing the UE capability information provided by an embodiment of the present application, the performing configuration associated with beam management in case that the SCG is in the deactivated state includes at least one of the followings:

performing PSCell beam measurement and reporting in case that the SCG is in the deactivated state;

performing PSCell beam failure detection in case that the SCG is in the deactivated state;

performing PSCell beam failure recovery in case that the SCG is in the deactivated state;

performing SCG SCell beam measurement and reporting in case that the SCG is in the deactivated state;

performing SCG SCell beam failure detection in case that the SCG is in the deactivated state; or performing SCG SCell beam failure recovery in case that the SCG is in the deactivated state.

According to the method for processing the UE capability information provided by an embodiment of the present application, the performing configuration associated with SRS transmission in case that the SCG is in the deactivated state includes at least one of the followings:

performing SRS transmission in case that the SCG is in the deactivated state; or performing relaxed SRS transmission in case that the SCG is in the deactivated state.

According to the method for processing the UE capability information provided by an embodiment of the present application, the performing configuration associated with maintaining the uplink timing advance value in case that the SCG is in the deactivated state includes at least one of the followings:

maintaining the uplink TA value in case that the SCG is in the deactivated state; or running a temporary uplink TAT in case that the SCG is in the deactivated state.

According to the method for processing the UE capability information provided by an embodiment of the present application, the performing configuration for directly configuring the SCG to be in the deactivated state includes at least one of the followings:

upon performing SCG addition, configuring added SCG to be in the deactivated state directly;

upon performing SCG reconfiguration, configuring reconfigured SCG to be in the deactivated state directly;

upon performing conditional PSCell addition, configuring the SCG to be in the deactivated state directly;

upon performing PSCell change, configuring the SCG to be in the deactivated state directly;

upon reconfiguration with sync of PSCell, configuring the SCG to be in the deactivated state directly;

upon performing conditional PSCell change, configuring the SCG to be in the deactivated state directly;

upon performing RRC connection resume, configuring the SCG to be in the deactivated state directly;

upon performing PCell handover, configuring the SCG to be in the deactivated state directly; or upon reconfiguration with sync of PCell, configuring the SCG to be in the deactivated state directly.

According to the method for processing the UE capability information provided by an embodiment of the present application, the performing configuration associated with the reconfiguration in case that the SCG is in the deactivated state includes at least one of the followings:

performing SCell addition in case that the SCG is in the deactivated state;

performing SCell release in case that the SCG is in the deactivated state;

performing SCell reconfiguration in case that the SCG is in the deactivated state;

performing PSCell change in case that the SCG is in the deactivated state;

performing reconfiguration with sync of PSCell in case that the SCG is in the deactivated state;

performing conditional PSCell change in case that the SCG is in the deactivated state;

performing SCG release in case that the SCG is in the deactivated state;

performing PSCell reconfiguration in case that the SCG is in the deactivated state;

performing PCell handover in case that the SCG is in the deactivated state; or performing reconfiguration with sync of PCell in case that the SCG is in the deactivated state.

An embodiment of the present application provides a method for processing user equipment (UE) capability information, including:

obtaining first capability information reported from the UE, where the first capability information is UE capability information associated with a secondary cell group (SCG) deactivated state; and transmitting first configuration information to the UE, where the first configuration information is used to indicate the UE to perform configuration associated with the SCG deactivated state.

According to the method for processing the UE capability information provided by an embodiment of the present application, before obtaining the first capability information reported from the UE, the method further includes:

transmitting a capability request message to the UE, where the capability request message includes first indication information for indicating the UE to report the first capability information.

An embodiment of the present application provides a user equipment (UE), including a memory storing a computer program, a processor, and a transceiver transmitting and receiving data under a control of the processor;

the computer program, when executed by the processor, causes the UE to perform the following operations of:

reporting first capability information to a network side device, where the first capability information is UE capability information associated with a secondary cell group (SCG) deactivated state;

receiving first configuration information transmitted from the network side device, where the first configuration information is used to indicate the UE to perform configuration associated with the SCG deactivated state; and performing the configuration associated with the SCG deactivated state.

According to the UE provided by an embodiment of the present application, before reporting the first capability information to the network side device, the computer program, when executed by the processor, causes the UE to further perform the following operation of:

obtaining a capability request message transmitted from the network side device, where the capability request message includes first indication information for indicating the UE to report the first capability information.

According to the UE provided by an embodiment of the present application, the first capability information includes at least one of the followings:

whether the UE supports a capability associated with the SCG deactivated state;

whether the UE supports a capability associated with SCG state transition;

whether the UE supports a capability associated with performing channel state information reference signal (CSI-RS) measurement and reporting in case that the SCG is in a deactivated state;

whether the UE supports a capability associated with performing radio resource management (RRM) measurement and reporting in case that the SCG is in a deactivated state;

whether the UE supports a capability associated with performing radio link monitoring (RLM) measurement and radio link failure (RLF) reporting in case that the SCG is in a deactivated state;

whether the UE supports a capability associated with performing beam management in case that the SCG is in a deactivated state;

whether the UE supports a capability associated with performing sounding reference signal (SRS) transmission in case that the SCG is in a deactivated state;

whether the UE supports a capability associated with maintaining an uplink timing advance value in case that the SCG is in a deactivated state;

whether the UE supports a capability to directly configure the SCG to be in a deactivated state; or whether the UE supports a capability associated with performing reconfiguration in case that the SCG is in a deactivated state.

According to the UE provided by an embodiment of the present application, the first capability information is distinguished by at least one of the following:

bands supported by the UE;

band combinations supported by the UE;

duplex modes supported by the UE;

transmission frequency ranges supported by the UE;

types of radio access networks supported by the UE;

types of multi-connectivity network architectures supported by the UE;

types of radio access networks for a master node (MN) supported by the UE; or types of radio access networks for a secondary node (SN) supported by the UE.

According to the UE provided by an embodiment of the present application, the first capability information includes at least one type of indication information for the capability associated with SCG state transition, where the indication information includes at least one of the followings:

whether the UE supports performing the SCG state transition through a medium access control layer control element (MAC CE);

whether the UE supports performing the SCG state transition through downlink control information (DCI);

whether the UE supports performing the SCG state transition through radio resource control (RRC);

whether the UE supports performing the SCG state transition through a timer.

According to the UE provided by an embodiment of the present application, the first capability information includes at least one type of indication information for the capability associated with performing CSI-RS measurement and reporting in case that the SCG is in the deactivated state, where the indication information includes at least one of the followings:

whether the UE supports periodically reporting CSI-RS measurement results through an MN side in case that the SCG is in the deactivated state;

whether the UE supports semi-persistently reporting CSI-RS measurement results through an MN side in case that the SCG is in the deactivated state;

whether the UE supports aperiodically reporting CSI-RS measurement results through an MN side in case that the SCG is in the deactivated state; or whether the UE supports reporting CSI-RS measurement results through a pre-configured SCG resource in case that the SCG is in the deactivated state.

According to the UE provided by an embodiment of the present application, the first capability information includes at least one type of indication information for the capability associated with performing RRM measurement and reporting in case that the SCG is in the deactivated state, where the indication information includes at least one of the followings:

whether the UE supports performing RRM measurement in case that the SCG is in the deactivated state;

whether the UE supports performing relaxed RRM measurement in case that the SCG is in the deactivated state;

whether the UE supports performing RRM measurement based on measurement configuration configured on an SCG side in case that the SCG is in the deactivated state; or whether the UE supports performing relaxed RRM measurement based on measurement configuration configured on an SCG side in case that the SCG is in the deactivated state.

According to the UE provided by an embodiment of the present application, the first capability information includes at least one type of indication information for the capability associated with performing RLM measurement and RLF reporting in case that the SCG is in the deactivated state, where the indication information includes at least one of the followings:

whether the UE supports performing RLM measurement in case that the SCG is in the deactivated state;

whether the UE supports performing RLF reporting in case that the SCG is in the deactivated state; or whether the UE supports performing RLM measurement and RLF reporting in case that the SCG is in the deactivated state.

According to the UE provided by an embodiment of the present application, the first capability information includes at least one type of indication information for the capability associated with performing beam management in case that SCG is in the deactivated state, where the indication information includes at least one of the followings:

whether the UE supports performing primary secondary cell (PSCell) beam measurement and reporting in case that the SCG is in the deactivated state;

whether the UE supports performing PSCell beam failure detection in case that the SCG is in the deactivated state;

whether the UE supports performing PSCell beam failure recovery in case that the SCG is in the deactivated state;

whether the UE supports performing SCG SCell beam measurement and reporting in case that the SCG is in the deactivated state;

whether the UE supports performing SCG SCell beam failure detection in case that the SCG is in the deactivated state; or whether the UE supports performing SCG SCell beam failure recovery in case that the SCG is in the deactivated state.

According to the UE provided by an embodiment of the present application, the first capability information includes at least one type of indication information for the capability associated with performing SRS transmission in case that SCG is in the deactivated state, where the indication information includes at least one of the followings:

whether the UE supports performing SRS transmission in case that the SCG is in the deactivated state; or whether the UE supports performing relaxed SRS transmission in case that the SCG is in the deactivated state.

According to the UE provided by an embodiment of the present application, the first capability information includes at least one type of indication information for the capability associated with maintaining an uplink timing advance value in case that SCG is in the deactivated state, where the indication information includes at least one of the followings:

whether the UE supports maintaining the uplink TA value in case that the SCG is in the deactivated state; or whether the UE supports running a temporary uplink timing advance timer (TAT) in case that the SCG is in the deactivated state.

According to the UE provided by an embodiment of the present application, the first capability information includes at least one type of indication information for the capability to directly configure the SCG to be in the deactivated state, where the indication information includes at least one of the followings:

whether the UE supports directly configuring the SCG to be in the deactivated state in case of performing SCG addition;

whether the UE supports directly configuring the SCG to be in the deactivated state in case of performing SCG reconfiguration;

whether the UE supports directly configuring the SCG to be in the deactivated state in case of performing conditional PSCell addition;

whether the UE supports directly configuring the SCG to be in the deactivated state in case of performing PSCell change;

whether the UE supports directly configuring the SCG to be in the deactivated state in case of performing reconfiguration with sync of PSCell;

whether the UE supports directly configuring the SCG to be in the deactivated state in case of performing conditional PSCell change;

whether the UE supports directly configuring the SCG to be in the deactivated state in case of performing RRC connection resume;

whether the UE supports directly configuring the SCG to be in the deactivated state in case of performing primary cell (PCell) handover; or whether the UE supports directly configuring the SCG to be in the deactivated state in case of performing reconfiguration with sync of PCell.

According to the UE provided by an embodiment of the present application, the first capability information includes at least one type of indication information for the capability associated with performing reconfiguration in case that SCG is in the deactivated state, where the indication information includes at least one of the followings:

whether the UE supports performing SCell addition in case that the SCG is in the deactivated state;

whether the UE supports performing SCell release in case that the SCG is in the deactivated state;

whether the UE supports performing SCell reconfiguration in case that the SCG is in the deactivated state;

whether the UE supports performing PSCell change in case that the SCG is in the deactivated state;

whether the UE supports performing reconfiguration with sync of PSCell in case that the SCG is in the deactivated state;

whether the UE supports performing conditional PSCell change in case that the SCG is in the deactivated state;

whether the UE supports performing SCG release in case that the SCG is in the deactivated state;

whether the UE supports performing SCG reconfiguration in case that the SCG is in the deactivated state;

whether the UE supports performing PCell handover in case that the SCG is in the deactivated state; or whether the UE supports performing reconfiguration with sync of PCell in case that the SCG is in the deactivated state.

An embodiment of the present application provides a network side device, including a memory storing a computer program, a processor and a transceiver transmitting and receiving data under a control of the processor;

the computer program, when executed by the processor, causes the network side device to perform the following operations of:

obtaining first capability information reported from the UE, where the first capability information is UE capability information associated with a secondary cell group (SCG) deactivated state; and transmitting first configuration information to the UE, where the first configuration information is used to indicate the UE to perform configuration associated with the SCG deactivated state.

According to the network side device provided by an embodiment of the present application, before obtaining the first capability information reported from UE, the computer program, when executed by the processor, causes the UE to further perform the following operation of:

transmitting a capability request message to the UE, where the capability request message includes first indication information for indicating the UE to report the first capability information.

An embodiment of the present application provides an apparatus for processing user equipment (UE) capability information, including:

a reporting device, used to report first capability information to a network side device, where the first capability information is UE capability information associated with a secondary cell group (SCG) deactivated state;

a receiving device, used to receive first configuration information transmitted from the network side device, where the first configuration information is used to indicate the UE to perform configuration associated with the SCG deactivated state; and a performing device, used to perform the configuration associated with the SCG deactivated state.

An embodiment of the present application provides an apparatus for processing user equipment (UE) capability information, including:

an obtaining device, used to obtain first capability information reported from the UE, where the first capability information is UE capability information associated with a secondary cell group (SCG) deactivated state; and a transmitting device, used to transmit first configuration information to the UE, where the first configuration information is used to indicate the UE to perform configuration associated with the SCG deactivated state.

An embodiment of the present application further provides a processor-readable storage medium storing a computer program that cause a processor to perform the steps of the methods for processing the UE capability information described above.

In the methods and apparatuses for processing the UE capability information, the devices and the storage medium according to the embodiments of the present application, by determining the UE capabilities associated with the SCG deactivated state in a multi-connectivity scenario, the network side device determines, based on the corresponding UE capabilities, whether or how to implement operations or configurations associated with the SCG deactivated state upon perform corresponding operations or configurations and ensures that the SCG is suspended to save energy in case that no data transmission on the SCG side occurs and the SCG may be quickly activated as needed for normal data transmission.

BRIEF DESCRIPTION OF THE DRAWINGS

In order to clearly illustrate the solutions disclosed in the embodiments of the present application or the related art, the drawings used in the descriptions of the embodiments or the related art are briefly described below. The drawings in the following description are only some embodiments of the present application.

FIG. 1 is a first schematic flowchart of a method for processing user equipment (UE) capability information according to an embodiment of the present application;

FIG. 2 is a second schematic flowchart of a method for processing UE capability information according to an embodiment of the present application;

FIG. 3 is a schematic structural diagram of a UE according to an embodiment of the present application;

DETAILED DESCRIPTION

Figure 4:
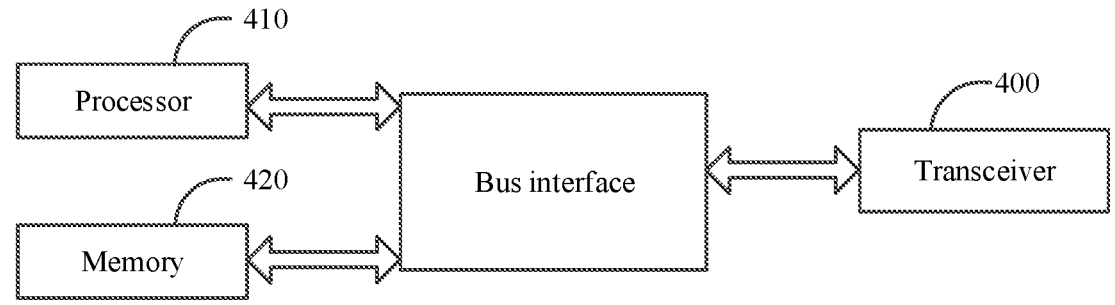
FIG. 4 is a schematic structural diagram of a network side device according to an embodiment of the present application.

In order to increase a data transmission rate, a network side device may configure a secondary cell group (SCG) for a user equipment (UE) to balance loads and improve the data transmission rate of the UE. After the network side device configures the SCG for the UE, the UE is connected to a secondary node (SN) on a primary secondary cell (PSCell) of the SCG. The network side device may configure bearer transmission in the SCG for the UE. The UE maintains configuration information of a master cell group (MCG) and the SCG simultaneously.

The new radio (NR) R17 project is expected to support an SCG deactivated state or an SCG suspended state or an SCG dormant state or a PSCell deactivated state or a PSCell suspended state or a PSCell dormant state. For example, for infrequent large data flows, in case that no larger data packet transmission or no data transmission on the SCG side occurs, the SCG is suspended, that is, both the UE and the network side device save SCG contexts, but some actions are suspended, for example, the UE stops monitoring the physical downlink control channel (PDCCH) from the SCG side, the UE does not monitor the SCG channel, and the UE stops data transmission to the SCG side, etc., which save UE power consumption. In case that a larger data flow interaction occurs or data transmission occurs on the SCG side, the SCG of the UE is quickly activated for data transmission.

In case that the SCG is in a deactivated state, the PSCell should be in an inactive state, and at least one SCell should be in an inactive state.

Wireless communication relies on accurate and efficient coordination and intercommunication between the UE and the base station. UE capability is an important part of the coordination between the base station and the UE. UE capability includes a security capability, a positioning capability, a measurement capability, a physical channel capability, and a transmission channel capability, etc. The base station may make correct scheduling for UE only after knowing the UE capability. If the UE has a capability to support functions, the base station may configure the function for the UE; or if the UE does not have a capability to support functions, the base station may not configure the function for the UE. In addition, UE capabilities of UEs are inconsistent due to different manufacturers and specifications of the UEs. Therefore, after radio resource control (RRC) connection is established, the UE should exchange its UE capability information with the network side device, and then the base station may configure the UE based on capability parameters of the UE.

Relevant configurations and operations at the network side device should be implemented based on UE capability, otherwise problems arise. It is expected to introduce the SCG deactivated state in the multi-connection research of R17 to achieve that the SCG is suspended to save energy in case that no data transmission on the SCG side occurs, or the SCG is quickly activated for normal data transmission as needed. However, UE capabilities associated with the SCG deactivated state are unclear. Therefore, the UE capability associated with the SCG deactivated state in the multi-connection scenario is considered to assist the network side device in configuring the SCG deactivation in the multi-connection scenario.

In order to illustrate embodiments of the present application clearly, the embodiments of the present application are clearly and completely described in the following in conjunction with the accompanying drawings in the present application. These embodiments are a part of the embodiments of the present application, and not all of the embodiments.

The meaning of "associated with" in the present application may be understood as "related to", both of which mean that they are associated with each other.

FIG. 1 is a first schematic flowchart of a method for processing user equipment (UE) capability information according to an embodiment of the present application. As shown in FIG. 1, the method for processing UE capability information according to an embodiment of the present application may be performed by UE, such as a mobile phone. The method includes:

step 101, reporting first capability information to a network side device, where the first capability information is UE capability information associated with a secondary cell group (SCG) deactivated state;

step 102: receiving first configuration information transmitted from the network side device, where the first configuration information is used to indicate the UE to perform configuration associated with the SCG deactivated state; and step 103, performing the configuration associated with the SCG deactivated state.

In an embodiment of the present application, before reporting the first capability information to the network side device, the method further includes:

obtaining a capability request message transmitted from the network side device, where the capability request message includes first indication information for indicating the UE to report the first capability information.

In an embodiment of the present application, the UE actively reports a capability associated with the SCG deactivated state to the network side device by the following steps.

In step 1, the UE reports a UE capability associated with the SCG deactivated state mentioned in the above embodiments to a core network during an initial registration or a tracking area update (TAU).

In step 2, the core network stores the UE capability associated with the SCG deactivated state reported by the UE in a corresponding UE context.

In an embodiment of the present application, in case that the base station side does not store the capability associated with the SCG deactivated state, the base station obtains the UE capability from the core network by the following steps.

In step 1, the base station transmits an NG interface message to the core network, where the NG interface message carries an indication for requesting the UE capability associated with the SCG deactivated state.

In step 2, the core network inquires, from stored UE context, whether the UE capability associated with the SCG deactivated state is stored.

In step 3*a*, in case that the UE capability associated with the SCG deactivated state is stored in the stored UE context, the core network carries, in a response message transmitted to the base station, the UE capability associated with the SCG deactivated state.

In step 3*b*, in case that the UE capability associated with the SCG deactivated state is not stored in the stored UE context, the core network carries, in a response message transmitted to the base station, an indication that the core network does not store the UE capability associated with the SCG deactivated state.

In an embodiment of the present application, in case that neither the core network nor the base station stores the UE capability associated with the SCG deactivated state, capability interaction between the UE and the network side device is performed by the following steps.

In step 1, the base station transmits a capability request message to the UE for requesting the UE to report the UE capability associated with the SCG deactivated state.

In step 2, in case that the UE receives the capability request message transmitted from the base station, the UE, based on a level corresponding to the UE capability associated with the SCG deactivated state requested by the base station, packages the UE capability associated with the SCG deactivated state in a UE-MRDC-Capability and/or a UE-NR-Capability and/or a UE-E-UTRA-Capability corresponding to the level of the UE capability and reports the UE capability to the base station, where the level corresponding to the UE capability includes a multi-radio dual connectivity (MR-DC) level, and/or a master base station/a master node (MN) level, and/or a secondary base station/secondary node (SN) level.

In step 3, after receiving the UE capability associated with the SCG deactivated state reported by the UE, the base station stores the UE capability in the UE context at the base station side. In an embodiment, the base station transmits the UE capability associated with the SCG deactivated state to the core network through an NG interface message and the core network stores the UE capability in the UE context at the core network.

In step 4, in case of receiving the UE capability associated with the SCG deactivated state, the master base station/MN transmits a capability corresponding to the MR-DC level and a capability corresponding to the SN level to the secondary base station/SN through an interface message, where in case of (NG-RAN)E-UTRA-NR dual connectivity ((NG)EN-DC)) or NR-NR dual connectivity (NR-DC), UE capabilities included in both UE-MRDC-Capability and UE-NR-Capability are transmitted to the SN side; and in case of NR-E-UTRA dual connectivity (NE-DC), UE capabilities included in both UE-MRDC-Capability and UE-EUTRA-Capability are transmitted to the MN side.

In step 5, in case that the network side device needs to perform corresponding operations, the network side device queries the UE capability stored in the UE context, and performs corresponding configurations and operations based on the UE capability.

For example, in case that the first capability information indicates that UE1 capability associated with the SCG deactivated state is to support SCG state transition, the network side device may transmit first configuration information to instruct UE1 to perform SCG state transition; and in case that the first capability information indicates that UE1 capability associated with the SCG deactivated state is not to support SCG state transition, the network side device may not transmit first configuration information to instruct UE1 to perform SCG state transition.

For another example, in case that the first capability information indicates that UE1 capability associated with the SCG deactivated state is to support a full-duplex mode, the network side device may transmit first configuration information to instruct UE1 to perform data transmission in full-duplex mode; and in case that the first capability information indicates that UE1 capability associated with the SCG deactivated state is to support a half-duplex mode, the network side device may transmit first configuration information to instruct UE1 to perform data transmission in half-duplex mode.

The manner of performing corresponding configurations and operations based on other UE capabilities is similar to the above example, which is not repeated in the present application.

In an embodiment of the present application, the first capability information includes at least one of the followings:

whether the UE supports a capability associated with the SCG deactivated state;

whether the UE supports a capability associated with SCG state transition;

whether the UE supports a capability associated with performing channel state information reference signal (CSI-RS) measurement and reporting in case that the SCG is in a deactivated state;

whether the UE supports a capability associated with performing radio resource management (RRM) measurement and reporting in case that the SCG is in a deactivated state;

whether the UE supports a capability associated with performing radio link monitoring (RLM) measurement and radio link failure (RLF) reporting in case that the SCG is in a deactivated state;

whether the UE supports a capability associated with performing beam management in case that the SCG is in a deactivated state;

whether the UE supports a capability associated with performing sounding reference signal (SRS) transmission in case that the SCG is in a deactivated state;

whether the UE supports a capability associated with maintaining an uplink timing advance in case that the SCG is in a deactivated state;

whether the UE supports a capability to directly configure the SCG to be in a deactivated state; or whether the UE supports a capability associated with performing reconfiguration in case that the SCG is in a deactivated state.

In an embodiment of the present application, the first capability information is distinguished by at least one of the followings:

bands supported by the UE;

band combinations supported by the UE;

duplex modes supported by the UE;

transmission frequency ranges supported by the UE;

types of radio access network side devices supported by the UE;

types of multi-connectivity network side device architectures supported by the UE;

types of radio access network side devices for a master node (MN) supported by the UE; or types of radio access network side devices for a secondary node (SN) supported by the UE.

The capabilities associated with the SCG deactivated state mentioned in above embodiments are configured for per UE.

In an embodiment, the above UE capabilities associated with the SCG deactivated state may be distinguished by different bands, and/or different band combinations, and/or different duplex modes (TDD, FDD), and/or different transmission frequency ranges (FR1, FR2), and/or different types of radio access network side devices (NR, EUTRA, and new types of radio access network side devices that may be introduced in the future), and/or different types of multi-connectivity network side device architectures (EN-DC, NEEN-DC, NE-DC, NR-DC, and new types of multi-connectivity network side device architectures that may be introduced in the future), and/or the types of radio access network side devices for the MN (the MN is NR, EUTRA, and new types of radio access network side devices that may be introduced in the future), and/or types of radio access network side devices for the SN (the SN is NR, EUTRA, and new types of radio access network side devices that may be introduced in the future).

In an embodiment, the above UE capabilities associated with the SCG deactivated state may be configured at the MR-DC level, and/or at the MN level, and/or at the SN level. Capabilities at the MR-DC level are included in UE-MRDC-Capability, and/or UE-NR-Capability, and/or UE-E-UTRA-Capability.

In other words, different UE capabilities can be distinguished through different bands. In case that bands supported by two UEs are different, the capabilities associated with the SCG deactivated state of the two UEs are also different. For example, a band supported by UE1 is band A, and UE1 capability associated with the SCG deactivated state is to support SCG state transition; and a band supported by UE2 is band B, and UE2 capability associated with the SCG deactivated state is not to support SCG state transition.

Different UE capabilities may also be distinguished through different duplex modes. In case that duplex modes supported by two UEs are different, the capabilities associated with the SCG deactivated state of the two UEs are also different. For example, UE1 supports full-duplex mode, and UE1 capability associated with the SCG deactivated state is to support performing CSI-RS measurement and reporting in case that the SCG is in the deactivated state; and UE2 supports half-duplex mode, and UE2 capability associated with the SCG deactivated state is not to support performing CSI-RS measurement and reporting in case that the SCG is in the deactivated state.

Different UE capabilities may also be distinguished through different duplex modes and the types of the radio access network side devices. In case that both duplex modes and the types of the radio access network side devices supported by two UEs are different, the capabilities associated with the SCG deactivated state of the two UEs are also different. For example, UE1 supports full-duplex mode and supports NR, and UE1 capability associated with the SCG deactivated state is to support performing CSI-RS measurement and reporting in case that the SCG is in a deactivated state; UE2 supports half-duplex mode and supports NR, and UE2 capability associated with the SCG deactivated state is not to support performing CSI-R measurement and reporting in case that the SCG is in a deactivated state; UE3 supports full-duplex mode and supports EUTRA, and UE3 capability associated with the SCG deactivated state is to support performing SRS transmission in case that the SCG is in a deactivated state; and UE4 supports half-duplex mode and supports EUTRA, and UE4 capability associated with the SCG deactivated state is not to support performing SRS transmission in case that the SCG is in a deactivated state.

The manner of distinguishing UE capabilities through other items is similar to the above example, which is not repeated in the present application.

In an embodiment of the present application, the whether the UE supports the capability associated with the SCG deactivated state includes at least one of the followings:

whether the UE supports the SCG deactivated state;

whether the UE supports the SCG deactivated state under a specific multi-connectivity architecture;

whether the UE supports the SCG deactivated state under an EN-DC architecture;

whether the UE supports the SCG deactivated state under a NGEN-DC architecture;

whether the UE supports the SCG deactivated state under an NR-DC architecture;

whether the UE supports the SCG deactivated state under an NE-DC architecture;

whether the UE supports the SCG deactivated state in case that the master node (MN) is a specific radio access technology (RAT);

whether the UE supports the SCG deactivated state in case that the MN is EUTRA;

whether the UE supports the SCG deactivated state in case that the MN is new radio (NR);

whether the UE supports the SCG deactivated state in case that an SN is a specific RAT;

whether the UE supports the SCG deactivated state in case that the SN is EUTRA; or whether the UE supports the SCG deactivated state in case that the SN is NR.

Whether the UE supports the SCG deactivated state indicates whether the UE supports a configuration for the SCG deactivated state. In case that the UE supports the SCG deactivated state, the network side device may configure the SCG to be the deactivated state to reduce power consumption as needed, for example, infrequent large data flows are transmitted, or no larger data packet is transmitted, or no data transmission on the SCG side occurs; or in case that the UE does not support the SCG deactivated state, the network side device may not configure the SCG to be the deactivated state.

Whether the UE supports the SCG deactivated state under a specific multi-connectivity architecture is whether the UE supports a configuration for the SCG deactivated state only under the specific multi-connectivity architecture. The multi-connectivity architecture here includes EN-DC, and/or NGEN-DC, and/or NE-DC, and/or NR-DC, and/or new types of multi-connectivity architectures that may be introduced in the future.

Whether the UE supports the SCG deactivated state under the EN-DC architecture is whether the UE supports a configuration for the SCG deactivated state in case that the EN-DC is configured.

Whether the UE supports the SCG deactivated state under the NGEN-DC architecture is whether the UE supports a configuration for the SCG deactivated state in case that the NGEN-DC is configured.

Whether the UE supports the SCG deactivated state under the NR-DC architecture is whether the UE supports a configuration for the SCG deactivated state in case that the NR-DC is configured.

Whether the UE supports the SCG deactivated state under the NE-DC architecture is whether the UE supports a configuration for the SCG deactivated state in case that the NE-DC is configured.

Whether the UE supports the SCG deactivated state in case that the MN is a specific RAT is whether the UE supports a configuration for the SCG deactivated state only in case that the MN is the specific RAT. The RAT here may be EUTRA, and/or NR, and/or a new type of RAT that may be introduced in the future.

Whether the UE supports the SCG deactivated state in case that the MN is EUTRA is whether the UE supports a configuration for the SCG deactivated state in case that the MN is EUTRA.

Whether the UE supports the SCG deactivated state in case that the MN is NR is whether the UE supports a configuration for the SCG deactivated state in case that the MN is NR.

Whether the UE supports the SCG deactivated state in case that the SN is a specific RAT is whether the UE supports a configuration for the SCG deactivated state only in case that the SN is the specific RAT. The RAT here may be EUTRA, and/or NR, and/or a new type of RAT that may be introduced in the future.

Whether the UE supports the SCG deactivated state in case that the SN is EUTRA is whether the UE supports a configuration for the SCG deactivated state in case that the SN is EUTRA.

Whether the UE supports the SCG deactivated state in case that the SN is NR is whether the UE supports a configuration for the SCG deactivated state in case that the SN is NR.

In an embodiment of the present application, the first capability information includes at least one type of indication information for the capability associated with SCG state transition, where the indication information includes at least one of the followings:

whether the UE supports performing SCG state transition through a medium access control layer control element (MAC CE);

whether the UE supports performing SCG state transition through downlink control information (DCI);

whether the UE supports performing SCG state transition through RRC; or whether the UE supports performing SCG state transition through a timer.

In an embodiment, whether the UE supports performing SCG state transition through the MAC CE is whether the UE supports to transition an SCG state to an activated state or a deactivated state through the MAC CE. In case that the UE supports to transition the SCG state through the MAC CE, the network side device may transmit an MAC CE command to perform the SCG state transition.

Whether the UE supports performing SCG state transition through the DCI is whether the UE supports to transition an SCG state to an activated state or a deactivated state through the DCI. In case that the UE supports to transition the SCG state through the DCI, the network side device may transmit a DCI command to perform the SCG state transition.

Whether the UE supports performing SCG state transition through the RRC is whether the UE supports to transition an SCG state to an activated state or a deactivated state through an RRC signaling. In case that the UE supports to transition the SCG state through the RRC, the network side device may transmit a dedicated RRC signaling to control the SCG state transition.

Whether the UE supports performing SCG state transition through the timer is whether the UE supports to transition an SCG state to an activated state or a deactivated state through the timer. In case that the UE supports SCG state transition through the timer, the network side device may configure an SCG state transition timer T1 for the UE, and perform the SCG state transition by controlling on-off of the timer T1. For example, in case that the timer is configured and started, the SCG enters into the activated state or the deactivated state, and in case that the timer is not configured or stops or expires, the SCG transitions to the deactivated state or the activated state.

It should be noted that the UE capability associated with the SCG deactivated state may include one or more SCG state transition capabilities, and one SCG state transition capability may correspond to one or more types of indication information.

In an embodiment of the present application, the first capability information includes at least one type of indication information for the capability associated with performing CSI-RS measurement and reporting in case that the SCG is in a deactivated state, where the indication information includes at least one of the followings:

whether the UE supports periodically reporting CSI-RS measurement results through the MN side in case that the SCG is in the deactivated state;

whether the UE supports semi-persistently reporting CSI-RS measurement results through the MN side in case that the SCG is in the deactivated state;

whether the UE supports aperiodically reporting CSI-RS measurement results through the MN side in case that the SCG is in the deactivated state; or whether the UE supports reporting CSI-RS measurement results through a pre-configured SCG resource in case that the SCG is in the deactivated state.

In an embodiment, whether the UE supports periodically reporting the CSI-RS measurement results through the MN side in case that the SCG is in the deactivated state is whether the UE in the SCG deactivated state supports periodically reporting the CSI-RS measurements configured on the SN side and/or the MN side through the MN side.

Whether the UE supports semi-persistently reporting the CSI-RS measurement results through the MN side in case that the SCG is in the deactivated state is whether the UE in the SCG deactivated state supports semi-persistently reporting the CSI-RS measurements configured on the SN side and/or the MN side through the MN side.

Whether the UE supports aperiodically reporting the CSI-RS measurement results through the MN side in case that the SCG is in the deactivated state is whether the UE in the SCG deactivated state supports aperiodically reporting the CSI-RS measurements configured on the SN side and/or the MN side through the MN side.

Whether the UE supports reporting CSI-RS measurement results through the pre-configured SCG resource in case that the SCG is in the deactivated state is whether the UE in the SCG deactivated state supports reporting the CSI-RS measurements through the pre-configured SCG resource. In case that the UE supports reporting the CSI-RS measurement results through the pre-configured SCG resource in case that the SCG is in the deactivated state, the SN side pre-configures the SCG resource for measurement reporting for the UE.

It should be noted that the UE capability associated with the SCG deactivated state may include one or more capabilities associated with performing the CSI-RS measurement and reporting in case that the SCG is in the deactivated state, and one capability associated with performing the CSI-RS measurement and reporting in case that the SCG is in the deactivated state may correspond to one or more types of indication information.

In an embodiment of the present application, the first capability information includes at least one type of indication information for the capability associated with performing RRM measurement and reporting in case that SCG is in a deactivated state, where the indication information includes at least one of the followings:

whether the UE supports performing RRM measurement in case that the SCG is in the deactivated state;

whether the UE supports performing relaxed RRM measurement in case that the SCG is in the deactivated state;

whether the UE supports performing RRM measurement based on measurement configuration configured on the SCG side in case that the SCG is in the deactivated state; or whether the UE supports performing relaxed RRM measurement based on measurement configuration configured on the SCG side in case that the SCG is in the deactivated state.

In an embodiment, whether the UE supports performing RRM measurement and reporting in case that the SCG is in the deactivated state is whether the UE in the SCG deactivated state supports RRM measurement and reporting.

Whether the UE supports performing relaxed RRM measurement in case that the SCG is in the deactivated state is whether the UE in the SCG deactivated state supports relaxed RRM measurement, including but not limited to only performing long-period RRM measurement, and/or only measuring PSCell, and/or only measuring SCell, and/or only performing inter-RAT measurement, and/or only performing intra-RAT measurement, etc.

The relaxed RRM measurement is that the terminal performs the RRM measurement based on a relaxed RRM measurement criterion including but not limited to a measurement cycle, measurement accuracy, a measurement cell or types of RAT, measurement trigger conditions, etc.

Whether the UE supports performing RRM measurement and reporting based on measurement configuration configured on the SCG side in case that the SCG is in the deactivated state is whether the UE in the SCG deactivated state supports performing RRM measurement and reporting based on the measurement configuration configured on the SCG side.

Whether the UE supports performing relaxed RRM measurement based on measurement configuration configured on the SCG side in case that the SCG is in the deactivated state is whether the UE in the SCG deactivated state supports performing the relaxed RRM measurement based on measurement configuration configured on the SCG side, including but not limited to only performing long-period RRM measurement, and/or only measuring PSCell, and/or only measuring SCell, and/or only performing inter-RAT measurement, and/or only performing intra-RAT measurement, etc.

It should be noted that the UE capabilities associated with the SCG deactivated state may include one or more capabilities associated with performing the RRM measurement and reporting in case that the SCG is in the deactivated state, and one capability associated with performing the RRM measurement and reporting in case that the SCG is in the deactivated state may correspond to one or more types of indication information.

In an embodiment of the present application, the first capability information includes at least one type of indication information for the capability associated with performing RLM measurement and RLF reporting in case that SCG is in a deactivated state, where the indication information includes at least one of the followings:

whether the UE supports performing the RLM measurement in case that the SCG is in the deactivated state;

whether the UE supports performing the RLF reporting in case that the SCG is in the deactivated state; or whether the UE supports performing the RLM measurement and the RLF reporting in case that the SCG is in the deactivated state.

In an embodiment, whether the UE supports performing the RLM measurement in case that the SCG is in the deactivated state is whether the UE in the SCG deactivated state supports performing the RLM measurement on the SCG side, including but not limited to CSI-RS-based RLM measurement and/or SSB-based RLM measurement.

Whether the UE supports performing the RLF reporting in case that the SCG is in the deactivated state is whether the UE in the SCG deactivated state supports performing the RLF reporting. The prerequisite for the UE to support RLF reporting is that the UE supports the RLM measurement.

Whether the UE supports performing the RLM measurement and the RLF reporting in case that the SCG is in the deactivated state is whether the UE in the SCG deactivated state supports performing the RLM measurement and the RLF reporting on the SCG side. In case that the UE supports the RLM measurement and the RLF reporting in case that the SCG is in the deactivated state, the UE supports the RLM measurement in case that the SCG is in the deactivated state, and supports the RLF reporting in case that the SCG is in the deactivated state.

It should be noted that the UE capabilities associated with the SCG deactivated state may include one or more capabilities associated with performing the RLM measurement and the RLF reporting in case that the SCG is in the deactivated state, and one capability associated with performing the RLM measurement and the RLF reporting in case that the SCG is in the deactivated state may correspond to one or more types of indication information.

In an embodiment of the present application, the first capability information includes at least one type of indication information for the capability associated with performing beam management in case that SCG is in a deactivated state, where the indication information includes at least one of the followings:

whether the UE supports performing PSCell beam measurement and reporting in case that the SCG is in the deactivated state;

whether the UE supports performing PSCell beam failure detection in case that the SCG is in the deactivated state;

whether the UE supports performing PSCell beam failure recovery in case that the SCG is in the deactivated state;

whether the UE supports performing SCG SCell beam measurement and reporting in case that the SCG is in the deactivated state;

whether the UE supports performing SCG SCell beam failure detection in case that the SCG is in the deactivated state; or whether the UE supports performing SCG SCell beam failure recovery in case that the SCG is in the deactivated state.

Whether the UE supports performing PSCell beam measurement and reporting in case that the SCG is in the deactivated state is whether the UE in the SCG deactivated state supports performing beam measurement and reporting for the PSCell, including but not limited to performing beam measurement and reporting for the PSCell based on the SSB, and/or performing beam measurement and reporting for the PSCell based on the CSI-RS.

Whether the UE supports performing PSCell beam failure detection in case that the SCG is in the deactivated state is whether the UE in the SCG deactivated state supports performing beam failure detection for the PSCell; or the UE capability is whether the UE in the SCG deactivated state supports performing beam failure detection for the PSCell and beam measurement and reporting for the PSCell.

Whether the UE supports performing PSCell beam failure recovery in case that the SCG is in the deactivated state is whether the UE in the SCG deactivated state supports performing beam failure recovery for the PSCell; or the UE capability is whether the UE in the SCG deactivated state supports performing beam failure recovery for the PSCell and beam failure detection for the PSCell under an MR-DC scenario.

Whether the UE supports performing SCG SCell beam measurement and reporting in case that the SCG is in the deactivated state is whether the UE in the SCG deactivated state supports beam measurement and reporting for the SCG SCell, including but not limited to performing beam measurement and reporting for the SCG SCell based on the SSB, and/or performing beam measurement and reporting for the SCG SCell based on the CSI-RS.

Whether the UE supports performing SCG SCell beam failure detection in case that the SCG is in the deactivated state is whether the UE in the SCG deactivated state supports performing beam failure detection for the SCG SCell; or the UE capability is whether the UE in the SCG deactivated state supports performing beam failure detection for the SCG SCell and beam measurement and reporting for the SCG SCell.

Whether the UE supports performing SCG SCell beam failure recovery in case that the SCG is in the deactivated state is whether the UE in the SCG deactivated state supports performing beam failure recovery for the SCG SCell; or the UE capability is whether the UE in the SCG deactivated state supports performing beam failure recovery for the SCG SCell and beam failure detection for the SCG SCell under an MR-DC scenario.

It should be noted that the UE capabilities associated with the SCG deactivated state may include one or more capabilities associated with performing beam management in case that the SCG is in the deactivated state, and one capability associated with performing beam management in case that the SCG is in the deactivated state may correspond to one or more types of indication information.

In an embodiment of the present application, the first capability information includes at least one type of indication information for the capability associated with performing SRS transmission in case that SCG is in a deactivated state, where the indication information includes at least one of the followings:

whether the UE supports performing SRS transmission in case that the SCG is in the deactivated state; or whether the UE supports performing relaxed SRS transmission in case that the SCG is in the deactivated state.

In an embodiment, whether the UE supports performing the SRS transmission in case that the SCG is in the deactivated state is whether the UE in the SCG deactivated state supports performing uplink SRS transmission.

Whether the UE supports performing the relaxed SRS transmission in case that the SCG is in the deactivated state is whether the UE in the SCG deactivated state supports performing relaxed SRS transmission, such as long-period SRS transmission.

It should be noted that the UE capabilities associated with the SCG deactivated state may include one or more capabilities associated with performing the SRS transmission in case that the SCG is in the deactivated state, and one capability associated with performing the SRS transmission in case that the SCG is in the deactivated state may correspond to one or more types of indication information.

In an embodiment of the present application, the first capability information includes at least one type of indication information for the capability associated with maintaining the uplink timing advance value in case that SCG is in a deactivated state, where the indication information includes at least one of the followings:

whether the UE supports maintaining the uplink timing advance value in case that the SCG is in the deactivated state; or whether the UE supports running a temporary uplink timing advance timer in case that the SCG is in the deactivated state.

In an embodiment, whether the UE supports maintaining the uplink timing advance value in case that the SCG is in the deactivated state is whether the UE in the SCG deactivated state supports continuous maintenance for the uplink timing advance (TA) value. In case that the UE supports maintaining the uplink TA value in case that the SCG is in the deactivated state, the network side device configures a long-term TA timer (TAT) for the UE. In case that the timer is running, the TA is valid and the UE maintains the TA. Before or in case that the timer expires, the network side device configures another TA value for the UE, and the UE restarts the TAT timer, and maintains the TA value during the running of the timer.

Whether the UE supports running a temporary uplink timing advance timer in case that the SCG is in the deactivated state is whether the UE in the SCG deactivated state supports maintaining the running of the temporary TAT. In case that the UE supports running the temporary uplink TAT in case that the SCG is in the deactivated state, the network side device configures a temporary TAT for the UE. Only in case that the timer is running, the TA is valid and the UE maintains the TA; and if the timer expires, the UE no longer maintains the TA.

The temporary means that the TAT is not updated.

It should be noted that the UE capabilities associated with the SCG deactivated state may include one or more capabilities associated with maintaining the uplink TA value in case that the SCG is in the deactivated state, and one capability associated with maintaining the uplink TA value in case that the SCG is in the deactivated state may correspond to one or more types of indication information.

In an embodiment of the present application, the first capability information includes at least one type of indication information for the capability to directly configure the SCG to be in a deactivated state, where the indication information includes at least one of the followings:

whether the UE supports directly configuring the SCG to be in the deactivated state in case of performing SCG addition;

whether the UE supports directly configuring the SCG to be in the deactivated state in case of performing SCG reconfiguration;

whether the UE supports directly configuring the SCG to be in the deactivated state in case of performing conditional PSCell addition;

whether the UE supports directly configuring the SCG to be in the deactivated state in case of performing PSCell change;

whether the UE supports directly configuring the SCG to be in the deactivated state in case of performing reconfiguration with sync of PSCell;

whether the UE supports directly configuring the SCG to be in the deactivated state in case of performing conditional PSCell change;

whether the UE supports directly configuring the SCG to be in the deactivated state in case of performing RRC connection resume;

whether the UE supports directly configuring the SCG to be in the deactivated state in case of performing primary cell (PCell) handover; or whether the UE supports directly configuring the SCG to be in the deactivated state in case of performing reconfiguration with sync of PCell.

In an embodiment, whether the UE supports directly configuring the SCG to be in the deactivated state in case of performing SCG addition is whether the UE supports directly configuring the SCG to be in the deactivated state in case of performing PSCell addition.

Whether the UE supports directly configuring the SCG to be in the deactivated state in case of performing SCG reconfiguration is whether the UE supports directly configuring the SCG to be in the deactivated state in case of performing SCG reconfiguration.

Whether the UE supports directly configuring the SCG to be in the deactivated state in case of performing conditional PSCell addition is whether the UE supports directly configuring the SCG to be in the deactivated state in case of performing conditional PSCell addition.

Whether the UE supports directly configuring the SCG to be in the deactivated state in case of performing PSCell change is whether the UE supports directly configuring the SCG to be in the deactivated state in case of performing PSCell change, that is, synchronous reconfiguration.

Whether the UE supports directly configuring the SCG to be in the deactivated state in case of performing reconfiguration with sync of PSCell is whether the UE supports directly configuring the SCG to be in the deactivated state in case of performing reconfiguration with sync of PSCell.

Whether the UE supports directly configuring the SCG to be in the deactivated state in case of performing conditional PSCell change is whether the UE supports directly configuring the SCG to be in the deactivated state in case of performing conditional PSCell change.

Whether the UE supports directly configuring the SCG to be in the deactivated state in case of performing RRC connection resume is whether the UE supports directly configuring the SCG to be in the deactivated state in case of performing RRC connection resume.

Whether the UE supports directly configuring the SCG to be in the deactivated state in case of performing PCell handover is whether the UE supports directly configuring the SCG to be in the deactivated state in case of performing PCell handover. The PCell handover here includes a handover between PCells with PSCell change, and/or a handover between PCells without PSCell change, and/or a handover from SA to NSA.

Whether the UE supports directly configuring the SCG to be in the deactivated state in case of performing reconfiguration with sync of PCell is whether the UE supports directly configuring the SCG to be in the deactivated state in case of performing reconfiguration with sync of PCell.

It should be noted that the UE capabilities associated with the SCG deactivated state may include one or more capabilities to directly configure the SCG to be the deactivated state, and one capability to directly configure the SCG to be the deactivated state may correspond to one or more types of indication information.

In an embodiment of the present application, the first capability information includes at least one type of indication information for the capability associated with performing reconfiguration in case that SCG is in a deactivated state, where the indication information includes at least one of the followings:

whether the UE supports performing SCell addition in case that the SCG is in the deactivated state;

whether the UE supports performing SCell release in case that the SCG is in the deactivated state;

whether the UE supports performing SCell reconfiguration in case that the SCG is in the deactivated state;

whether the UE supports performing PSCell change in case that the SCG is in the deactivated state;

whether the UE supports performing reconfiguration with sync of PSCell in case that the SCG is in the deactivated state;

whether the UE supports performing conditional PSCell change in case that the SCG is in the deactivated state;

whether the UE supports performing SCG release in case that the SCG is in the deactivated state;

whether the UE supports performing SCG reconfiguration in case that the SCG is in the deactivated state;

whether the UE supports performing PCell handover in case that the SCG is in the deactivated state; or whether the UE supports performing reconfiguration with sync of PCell in case that the SCG is in the deactivated state.

In an embodiment, whether the UE supports performing SCell addition in case that the SCG is in the deactivated state is whether the UE in the SCG deactivated state supports SCell addition.

Whether the UE supports performing SCell release in case that the SCG is in the deactivated state is whether the UE in the SCG deactivated state supports SCell release.

Whether the UE supports performing SCell reconfiguration in case that the SCG is in the deactivated state is whether the UE in the SCG deactivated state supports SCell reconfiguration.

Whether the UE supports performing PSCell change in case that the SCG is in the deactivated state is whether the UE in the SCG deactivated state supports PSCell change.

Whether the UE supports performing reconfiguration with sync of PSCell in case that the SCG is in the deactivated state is whether the UE in the SCG deactivated state supports reconfiguration with sync of PSCell.

Whether the UE supports performing conditional PSCell change in case that the SCG is in the deactivated state is whether the UE in the SCG deactivated state supports performing conditional PSCell change.

Whether the UE supports performing SCG release in case that the SCG is in the deactivated state is whether the UE in the SCG deactivated state supports SCG release directly.

Whether the UE supports performing SCG reconfiguration in case that the SCG is in the deactivated state is whether the UE in the SCG deactivated state supports SCG reconfiguration.

Whether the UE supports performing PCell handover in case that the SCG is in the deactivated state is whether the UE in the SCG deactivated state supports handover, including the handover between PCells with PSCell change, and/or the handover between PCells without PSCell change, and/or the handover from NSA to SA.

Whether the UE supports performing reconfiguration with sync of PCell in case that the SCG is in the deactivated state is whether the UE in the SCG deactivated state supports reconfiguration with sync of PCell.

It should be noted that the UE capabilities associated with the SCG deactivated state may include one or more capabilities to perform the reconfiguration in case that the SCG is in the deactivated state, and one capability to perform the reconfiguration in case that the SCG is in the deactivated state may correspond to one or more types of indication information.

In an embodiment of the present application, the performing the configuration associated with the SCG deactivated state includes at least one of the followings:

configuring the SCG to be in the deactivated state;

configuring a state transition of the SCG;

performing configuration associated with CSI-RS measurement and reporting in case that the SCG is in the deactivated state;

performing configuration associated with RRM measurement and reporting in case that the SCG is in the deactivated state;

performing configuration associated with RLM measurement and RLF reporting in case that the SCG is in the deactivated state;

performing configuration associated with beam management in case that the SCG is in the deactivated state;

performing configuration associated with SRS transmission in case that the SCG is in the deactivated state;

performing configuration associated with maintaining uplink TA value in case that the SCG is in a deactivated state;

performing configuration for directly configuring the SCG to be the deactivated state; or performing configuration associated with reconfiguration in case that the SCG is in the deactivated state.

In an embodiment of the present application, the configuring the SCG to be in the deactivated state includes at least one of the followings:

configuring the SCG to be in the deactivated state;

configuring the SCG to be in the deactivated state under the specific multi-connectivity architecture;

configuring the SCG to be in the deactivated state under the EN-DC architecture;

configuring the SCG to be in the deactivated state under the NGEN-DC architecture;

configuring the SCG to be in the deactivated state under the NR-DC architecture;

configuring the SCG to be in the deactivated state under the NE-DC architecture;

configuring the SCG to be in the deactivated state in case that the MN is a specific RAT;

configuring the SCG to be in the deactivated state in case that the MN is EUTRA;

configuring the SCG to be in the deactivated state in case that the MN is NR;

configuring the SCG to be in the deactivated state in case that the SN is a specific RAT;

configuring the SCG to be in the deactivated state in case that the SN is EUTRA; or configuring the SCG to be in the deactivated state in case that the SN is NR.

The configuring the SCG to be in the deactivated state may include the following steps.

In step 1, in case that the network side device needs to configure the SCG to be in the deactivated state, if the network side device stores corresponding UE capabilities, the network side device directly queries whether the UE supports capabilities associated with the SCG deactivated state; or if the network side device does not store the corresponding UE capabilities, the network side device requests a core network to obtain the UE capabilities associated with the SCG deactivated state stored in the core network; or if neither the network side device nor the core network stores the corresponding UE capabilities, the network side device requests the UE to report the UE capabilities associated with the SCG deactivated state including at least whether the UE supports the UE capability associated with the SCG state transition.

In step 2, in case that the UE supports the SCG deactivated state, the network side device may transmit, to the UE, a command for configuring the SCG to be in the deactivated state.

In an embodiment, in step 2a, in case that the UE supports a capability to configure the SCG deactivated state under the specific multi-connectivity architecture, the network side device may transmit, to the UE, a command for configuring the SCG to be the deactivated state in case that the specific multi-connectivity architecture is configured.

In an embodiment, in step 2b, in case that the UE supports a capability to configure the SCG deactivated state under the EN-DC architecture, the network side device may transmit, to the UE, a command for configuring the SCG to be the deactivated state in case that the EN-DC is configured.

In an embodiment, in step 2c, in case that the UE supports a capability to configure the SCG deactivated state under the NGEN-DC architecture, the network side device may transmit, to the UE, a command for configuring the SCG to be the deactivated state in case that the NGEN-DC is configured.

In an embodiment, in step 2d, in case that the UE supports a capability to configure the SCG deactivated state under the NE-DC architecture, the network side device may transmit, to the UE, a command for configuring the SCG to be the deactivated state in case that the EN-DC is configured.

In an embodiment, in step 2e, in case that the UE supports a capability to configure the SCG deactivated state under the NR-DC architecture, the network side device may transmit, to the UE, a command for configuring the SCG to be the deactivated state in case that the NR-DC is configured.

In an embodiment, in step 2f, in case that the UE supports a capability to configure the SCG deactivated state in case that the MN is a specific RAT, the network side device may transmit, to the UE, a command for configuring the SCG to be the deactivated state in case that the MN is the specific RAT.

In an embodiment, in step 2g, in case that the UE supports a capability to configure the SCG deactivated state in case that the MN is the EUTRA, the network side device may transmit, to the UE, a command for configuring the SCG to be the deactivated state in case that the MN is the EUTRA.

In an embodiment, in step 2h, in case that the UE supports a capability to configure the SCG deactivated state in case that the MN is NR, the network side device may transmit, to the UE, a command for configuring the SCG to be the deactivated state in case that the MN is the NR.

In an embodiment, in step 2i, in case that the UE supports a capability to configure the SCG deactivated state in case that the SN is a specific RAT, the network side device may transmit, to the UE, a command for configuring the SCG to be the deactivated state in case that the SN is the specific RAT.

In an embodiment, in step 2j, in case that the UE supports a capability to configure the SCG deactivated state in case that the SN is EUTRA, the network side device may transmit, to the UE, a command for configuring the SCG to be the deactivated state in case that the SN is the EUTRA.

In an embodiment, in step 2k, in case that the UE supports a capability to configure the SCG deactivated state in case that the SN is the NR, the network side device may transmit, to the UE, a command for configuring the SCG to be the deactivated state in case that the SN is the NR.

In step 3, after receiving the command for configuring the SCG to be the deactivated state, the UE configures the SCG to be in the deactivated state.

In an embodiment of the present application, the configuring the state transition of the SCG includes at least one of the followings:

configuring the state of the SCG to transition from the activated state to the deactivated state; or configuring the state of the SCG to transition from the deactivated state to the activated state.

The first configuration information includes at least one of the followings:

media access control-control element (MAC CE);

downlink control information (DCI); or radio resource control (RRC).

In an embodiment of the present application, configuration associated with SCG state transition is performed through MAC CE, and/or DCI, and/or RRC signaling, which includes the following steps.

In step 1, the network side device configures the SCG for the UE, and the SCG is in the activated state. In case that the network side device needs to transition the SCG to be in the deactivated state, if the network side device stores corresponding UE capabilities, the network side device directly queries whether the UE supports capabilities associated with the SCG state transition; or if the network side device does not store the corresponding UE capabilities, the network side device requests a core network to obtain the UE capabilities associated with the SCG deactivated state stored in the core network; or if neither the network side device nor the core network stores the corresponding UE capabilities, the network side device requests the UE to report the UE capabilities associated with the SCG deactivated state including at least whether the UE supports the UE capability associated with the SCG state transition.

In step 2: in case that the UE supports SCG state transition through the MAC CE and/or the DCI and/or the RRC signaling, the network side device performs the following corresponding operations according to the corresponding UE capabilities.

(1) In case that the UE supports the SCG state transition through the MAC CE, the network side device generates an MAC CE command for transitioning the SCG from the activated state to the deactivated state, and transmits the MAC CE command to the UE.

(2) In case that the UE supports the SCG state transition through the DCI, the network side device generates a DCI command for transitioning the SCG from the activated state to the deactivated state, and transmits the DCI command to the UE.

(3) In case that the UE supports the SCG state transition through the RRC signaling, the network side device generates an RRC command for transitioning the SCG from the activated state to the deactivated state, and transmits the RRC command to the UE.

In step 3, after receiving the MAC CE command, and/or the DCI command, and/or the RRC command transmitted from the network side device, the UE transitions the SCG from the activated state to the deactivated state.

In step 4, after receiving the MAC CE command, and/or the DCI command, and/or the RRC command transmitted from the network side device, the UE transitions the SCG from the deactivated state to the activated state.

In another embodiment, the network side device configures the SCG for the UE, and the SCG is in the deactivated state. In case that the network side device decides to transition the SCG to the activated state, the steps of generating an MAC CE command and/or a DCI command and/or an RRC command for transitioning the SCG from the activated state to the deactivated state and transmitting the MAC CE command and/or the DCI command and/or the RRC command to the UE are similar to those for transitioning the SCG from the deactivated state to the activated state, which are not repeated in the present application.

In an embodiment of the present application, the configuring the state transition of the SCG includes:

starting a first timer, and configuring the state of the SCG to transition from the deactivated state to the activated state; or starting a second timer, and configuring the state of the SCG to transition from the activated state to the deactivated state.

In the embodiment of the present application, configuration associated with SCG state transition is performed through the timer, which includes the following steps.

In step 1, the network side device configures the SCG for the UE, and the SCG is in the deactivated state. In case that the network side device needs to transition the SCG to be in the activated state, if the network side device stores corresponding UE capabilities, the network side device directly queries whether the UE supports capabilities associated with the SCG activated state; or if the network side device does not store the corresponding UE capabilities, the network side device requests a core network to obtain the UE capabilities associated with the SCG deactivated state stored in the core network; or if neither the network side device nor the core network stores the corresponding UE capabilities, the network side device requests the UE to report the UE capabilities associated with the SCG deactivated state including at least whether the UE supports the UE capability associated with the SCG state transition.

In step 2, in case that the UE supports performing the SCG state transition through a timer, the network side device configures a state transition timer T1 for the UE, and transmits configuration information corresponding to the state transition timer T1 to the UE.

In step 3a, after receiving the configuration information corresponding to the state transition timer T1, the UE starts the timer T1 and transitions the SCG to the activated state.

In step 3b, in case that there is no data transmission on the SCG, the UE stops the timer T1 and transitions the SCG to the deactivated state.

In step 3c, in case that the timer T1 expires, the UE transitions the SCG to the deactivated state.

In step 3d, in case that there is data transmission on the SCG and the timer is about to expire, the UE restarts the timer and keeps the SCG in the activated state.

In another embodiment, the network side device configures the SCG for the UE, and the SCG is in the activated state. In case that the network side device decides to transition the SCG to the deactivated state, a timer can be configured, and the turn-on of the timer corresponds to the situation of the SCG deactivated state, which is similar to the above-mentioned cases and is not repeated in the present application.

In an embodiment of the present application, the performing configuration associated with the CSI-RS measurement and reporting in case that the SCG is in the deactivated state includes at least one of the followings:

periodically reporting CSI-RS measurement results through the MN side in case that the SCG is in the deactivated state;
  semi-persistently reporting CSI-RS measurement results through the MN side in case that the SCG is in the deactivated state;
  aperiodically reporting CSI-RS measurement results through the MN side in case that the SCG is in the deactivated state; or
  reporting CSI-RS measurement results through the pre-configured SCG resource in case that the SCG is in the deactivated state.

In an embodiment, the UE performs the configuration associated with the CSI-RS measurement and reporting in case that the SCG is in the deactivated state, which includes the following steps.

In step 1, in case that the network side device needs to configure the UE to perform CSI-RS measurement and reporting in the SCG deactivated state, if the network side device stores corresponding UE capabilities, the network side device directly queries whether the UE supports capabilities associated with performing CSI-RS measurement and reporting in the SCG deactivated state; or if the network side device does not store the corresponding UE capabilities, the network side device requests a core network to obtain the UE capabilities associated with the SCG deactivated state stored in the core network; or if neither the network side device nor the core network stores the corresponding UE capabilities, the network side device requests the UE to report the UE capabilities associated with the SCG deactivated state including at least whether the UE supports the UE capability associated with performing CSI-RS measurement and reporting in the SCG deactivated state.

In step 2, in case that the UE supports performing CSI-RS measurement and reporting using resources pre-configured on the SCG side in the SCG deactivated state, the network side device pre-configures SCG side resources for measurement and reporting in the SCG deactivated state for the UE.

In an embodiment, before transitioning the SCG to the deactivated state, the network side device transmits a reserved SCG resource to the UE. Afterwards, the network side device transmits the SCG to the deactivated state, and indicates the UE to maintain the previously pre-configured SCG resource.

In an embodiment, the network side device transmits pre-configured SCG resource in the SCG state transition command while the network side device transitions the SCG to the deactivated state.

In an embodiment, the network side device first transitions the SCG to the deactivated state, and then transmits pre-configured SCG resource to the UE.

In step 2a, in case that the UE supports periodic, and/or semi-persistent, and/or aperiodic CSI-RS measurement and reporting through the MN side in case that the SCG is in the deactivated state, and/or performing CSI-RS measurement and reporting using the pre-configured resource on the SCG side, before transitioning the SCG to the deactivated state, the network side device transmits, to the UE, corresponding CSI-RS measurement configuration; and then the network side device transitions the SCG to the deactivated state and instructs the UE to maintain previous CSI-RS measurement configuration.

In an embodiment, the network side device transmits corresponding CSI-RS measurement configuration in the SCG state transition command while the network side device transitions the SCG to the deactivated state.

In an embodiment, the network side device first transitions the SCG to the deactivated state, and then transmits, to the UE, corresponding CSI-RS measurement configuration.

It should be noted that the CSI-RS measurement configuration here may be periodic, and/or aperiodic, and/or semi-persistent configuration, and may simultaneously include configurations on the MN side and/or SN side, which depends on the corresponding UE capability.

In step 3, after entering into the SCG deactivated state, the UE continues to perform CSI-RS measurement, and performs periodic, aperiodic, or semi-persistent CSI-RS measurement and reporting through the MN side, and/or perform CSI-RS measurement and reporting through the pre-configured resource on the SCG side. The way to perform the CSI-RS measurement and reporting depends on the UE capability and network side device configuration.

In an embodiment of the present application, the performing configuration associated with the RRM measurement and reporting in case that the SCG is in the deactivated state includes at least one of the followings:

performing the RRM measurement and reporting in case that the SCG is in the deactivated state;
  performing relaxed RRM measurement in case that the SCG is in the deactivated state;
  performing RRM measurement based on measurement configuration configured on the SCG side in case that the SCG is in the deactivated state; or performing relaxed RRM measurement based on measurement configuration configured on the SCG side in case that the SCG is in the deactivated state.

In an embodiment, the UE performs the configuration associated with the RRM measurement and reporting in case that the SCG is in the deactivated state, which includes the following steps.

In step 1, in case that the network side device needs to configure the UE to perform RRM measurement and reporting in the SCG deactivated state, if the network side device stores corresponding UE capabilities, the network side device directly queries whether the UE supports capabilities associated with performing RRM measurement and reporting in the SCG deactivated state; or if the network side device does not store the corresponding UE capabilities, the network side device requests a core network to obtain the UE capabilities associated with the SCG deactivated state stored in the core network; or if neither the network side device nor the core network stores the corresponding UE capabilities, the network side device requests the UE to report the UE capabilities associated with the SCG deactivated state including at least whether the UE supports the UE capability associated with performing RRM measurement and reporting in the SCG deactivated state.

In step 2a, in case that the UE supports RRM measurement and reporting and/or relaxed RRM measurement in case that the SCG is in the deactivated state, before transitioning the SCG to the deactivated state, the network side device transmits, to the UE, corresponding RRM measurement configuration; and then the network side device transitions the SCG to the deactivated state, and instructs the UE to maintain previous RRM measurement configuration.

In an embodiment, the network side device transmits corresponding RRM measurement configuration in the SCG state transition command while the network side device transitions the SCG to the deactivated state.

In an embodiment, the network side device first transitions the SCG to the deactivated state, and then transmits, to the UE, corresponding RRM measurement configuration.

It should be noted that the RRM configurations here include configuration on the MCG side and/or configuration on the SCG side. In addition, the RRM configurations here may be a conventional RRM measurement configuration and/or a conventional relaxed RRM measurement configuration, which depends on the corresponding UE capability.

In step 2b, in case that the UE supports performing RRM measurement based on pre-configured measurement configuration on the SCG side and/or performing relaxed RRM measurement based on pre-configured measurement configuration on the SCG side in case that the SCG is in the deactivated state, before transitioning the SCG to the deactivated state, the network side device transmits, to the UE, corresponding RRM measurement configuration; and then the network side device transitions the SCG to the deactivated state, and instructs the UE to maintain previous RRM measurement configuration.

In an embodiment, the network side device transmits corresponding RRM measurement configuration in the SCG state transition command while the network side device transitions the SCG to the deactivated state.

In an embodiment, the network side device first transitions the SCG to the deactivated state, and then transmits, to the UE, corresponding RRM measurement configuration.

It should be noted that the RRM configuration here is configured on the SCG side, and may also be a conventional RRM measurement configuration and/or a conventional relaxed RRM measurement configuration, which depends on the corresponding UE capability.

In step 3, the UE enters into the SCG deactivated state, continues to perform RRM measurement and reporting, or performs the relaxed RRM measurement and reporting based on the RRM measurement configuration transmitted from the network side device. The way to perform which operation depends on the UE capability and network side device configuration.

In an embodiment of the present application, the performing configuration associated with the RLM measurement and the RLF reporting in case that the SCG is in the deactivated state includes at least one of the followings:

performing the RLM measurement in case that the SCG is in the deactivated state;

performing the RLF reporting in case that the SCG is in the deactivated state; or performing the RLM measurement and the RLF reporting in case that the SCG is in the deactivated state.

In an embodiment, the UE performs the configuration associated with the RLM measurement and the RLF reporting in case that the SCG is in the deactivated state, which includes the following steps.

In step 1, in case that the network side device needs to configure the UE to perform the RLM measurement and/or the RLF reporting in the SCG deactivated state, if the network side device stores corresponding UE capabilities, the network side device directly queries whether the UE supports capabilities associated with performing the RLM measurement and the RLF reporting in the SCG deactivated state; or if the network side device does not store the corresponding UE capabilities, the network side device requests a core network to obtain the UE capabilities associated with the SCG deactivated state stored in the core network; or if neither the network side device nor the core network stores the corresponding UE capabilities, the network side device requests the UE to report the UE capabilities associated with the SCG deactivated state including at least whether the UE supports the UE capability associated with performing the RLM measurement and the RLF reporting in the SCG deactivated state.

In step 2, in case that the UE supports performing the RLM measurement and/or the RLF reporting in case that the SCG is in the deactivated state, before transitioning the SCG to the deactivated state, the network side device transmits, to the UE, RLM measurement configuration and/or RLF reporting configuration; and then the network side device transitions the SCG to the deactivated state, and instructs the UE to maintain previous RLM measurement configuration.

In an embodiment, the network side device transmits the RLM measurement configuration and/or the RLF reporting configuration in the SCG state transition command while the network side device transitions the SCG to the deactivated state.

In an embodiment, the network side device first transitions the SCG to the deactivated state, and then transmits, to the UE, configurations associated with the RLM measurement and/or the RLF reporting.

It should be noted that the configurations here may be RLM measurement configuration and/or RLF reporting configuration, which depends on the corresponding UE capability.

In step 3, the UE enters into the SCG deactivated state, and continues to perform RLM measurement and/or RLF reporting, which operation is performed depends on UE capability and network side device configuration.

In an embodiment of the present application, the performing configuration associated with the beam management in case that the SCG is in the deactivated state includes at least one of the followings:

performing PSCell beam measurement and reporting in case that the SCG is in the deactivated state;

performing PSCell beam failure detection in case that the SCG is in the deactivated state;

performing PSCell beam failure recovery in case that the SCG is in the deactivated state;

performing SCG SCell beam measurement and reporting in case that the SCG is in the deactivated state;

performing SCG SCell beam failure detection in case that the SCG is in the deactivated state; or performing SCG SCell beam failure recovery in case that the SCG is in the deactivated state.

In an embodiment, the UE performs the configuration associated with the beam management in case that the SCG is in the deactivated state, which includes the following steps.

In step 1, in case that the network side device needs to configure the UE to perform the beam measurement and reporting, and/or beam failure detection, and/or beam failure recovery in the SCG deactivated state, if the network side device stores corresponding UE capabilities, the network side device directly queries whether the UE supports capabilities associated with performing the beam management in the SCG deactivated state; or if the network side device does not store the corresponding UE capabilities, the network side device requests a core network to obtain the UE capabilities associated with the SCG deactivated state stored in the core network; or if neither the network side device nor the core network stores the corresponding UE capabilities, the network side device requests the UE to report the UE capabilities associated with the SCG deactivated state including at least whether the UE supports the UE capability associated with performing the beam management in the SCG deactivated state.

In step 2, in case that the UE supports performing the PSCell beam measurement and reporting, and/or the PSCell beam failure detection, and/or the PSCell beam failure recovery, and/or the SCG SCell beam measurement and reporting, and/or the SCG SCell beam failure detection, and/or the SCG SCell beam failure recovery in case that the SCG is in the deactivated state, before transitioning the SCG to the deactivated state, the network side device transmits, to the UE, corresponding configuration associated with the beam management; and then the network side device transitions the SCG to the deactivated state, and instructs the UE to maintain previous configuration associated with the beam management.

In an embodiment, the network side device transmits configuration associated with the beam management in the SCG state transition command while the network side device transitions the SCG to the deactivated state.

In an embodiment, the network side device first transitions the SCG to the deactivated state, and then transmits, to the UE, the corresponding configuration associated with the beam management.

It should be noted that the configuration here may be configuration corresponding to the PSCell beam measurement and reporting, and/or configuration corresponding to the PSCell beam failure detection, and/or configuration corresponding to the PSCell beam failure recovery, and/or configuration corresponding to the SCG SCell beam measurement and reporting, and/or configuration corresponding to the SCG SCell beam failure detection, and/or configuration corresponding to the SCG SCell beam failure recovery, which depends on the corresponding UE capability.

In step 3, the UE enters into the SCG deactivated state, and performs, based on the received configuration, the PSCell beam measurement and reporting, and/or the PSCell beam failure detection, and/or the PSCell beam failure recovery, and/or the SCG SCell beam measurement and reporting, and/or the SCG SCell beam failure detection, and/or the SCG SCell beam failure recovery, which operation is performed depends on the UE capability and network side device configuration.

In an embodiment of the present application, the performing configuration associated with the SRS transmission in case that the SCG is in the deactivated state includes at least one of the followings:

performing the SRS transmission in case that the SCG is in the deactivated state; or performing relaxed SRS transmission in case that the SCG is in the deactivated state.

In an embodiment, the UE performs the configuration associated with the SRS transmission in case that the SCG is in the deactivated state, which includes the following steps.

In step 1, in case that the network side device needs to configure the UE to perform the SRS transmission in the SCG deactivated state, if the network side device stores UE corresponding capabilities, the network side device directly queries whether the UE supports capabilities associated with performing the SRS transmission in the SCG deactivated state; or if the network side device does not store the corresponding UE capabilities, the network side device requests a core network to obtain the UE capabilities associated with the SCG deactivated state stored in the core network; or if neither the network side device nor the core network stores the corresponding UE capabilities, the network side device requests the UE to report the UE capabilities associated with the SCG deactivated state including at least whether the UE supports the UE capability associated with performing the SRS transmission in the SCG deactivated state.

In step 2, in case that the UE supports performing the SRS transmission and/or the relaxed SRS transmission in case that the SCG is in the deactivated state, before transitioning the SCG to the deactivated state, the network side device transmits, to the UE, SRS configuration, and then transitions the SCG to the deactivated state, and instructs the UE to maintain previous SRS configuration.

In an embodiment, the network side device transmits SRS configuration in the SCG state transition command while the network side device transitions the SCG to the deactivated state.

In an embodiment, the network side device first transitions the SCG to the deactivated state, and then transmits, to the UE, SRS configuration.

It should be noted that the SRS configuration here may be a conventional SRS configuration and/or a conventional relaxed SRS configuration, which depends on the corresponding UE capability.

In step 3, the UE enters into the SCG deactivated state, and performs, based on the received SRS configuration, the SRS transmission and/or the relaxed SRS transmission, which operation is performed depends on UE capability and network side device configuration.

In an embodiment of the present application, the performing configuration associated with maintaining the uplink TA value in case that the SCG is in the deactivated state includes at least one of the followings:

maintaining the uplink TA value in case that the SCG is in the deactivated state; or running a temporary uplink TAT in case that the SCG is in the deactivated state.

In an embodiment, the UE performs configuration associated with maintaining the uplink TA value in case that the SCG is in the deactivated state includes the following steps.

In step 1, in case that the network side device needs to configure the UE to maintain the TA in the SCG deactivated state, if the network side device stores corresponding UE capabilities, the network side device directly queries whether the UE supports capabilities associated with maintaining the TA in the SCG deactivated state; or if the network side device does not store the corresponding UE capabilities, the network side device requests a core network to obtain the UE capabilities associated with the SCG deactivated state stored in the core network; or if neither the network side device nor the core network stores the corresponding UE capabilities, the network side device requests the UE to report the UE capabilities associated with the SCG deactivated state including at least whether the UE supports UE capability associated with maintaining the TA in the SCG deactivated state.

In step 2, in case that the UE supports maintaining the uplink TA value and/or the temporary uplink TAT in case that the SCG is in the deactivated state, before transitioning the SCG to the deactivated state, the network side device configures a long-term and/or temporary TAT T2 for the UE and transmits, to the UE, timer configuration; then the network side device transitions the SCG to the deactivated state, and instructs the UE to maintain previous TAT configuration.

In an embodiment, the network side device transmits, to the UE, configurations associated with the long-term and/or temporary TAT T2 in the SCG state transition command while the network side device transitions the SCG to the deactivated state.

In an embodiment, the network side device first transitions the SCG to the deactivated state and then transmits, to the UE, configurations associated with the long-term and/or temporary TAT T2.

It should be noted that the TAT configuration here can be a temporary TAT configuration (in case that the UE supports maintaining the temporary uplink TAT in the SCG deactivated state), and/or a long-term TAT configuration (in case that the UE supports maintaining uplink TA value in case that the SCG is in the deactivated state), which depends on the corresponding UE capability.

In step 3, the UE enters into the SCG deactivated state and starts the TAT T2:

(1) In case that the network side device configures the temporary TAT, only in case that the timer is running, the TA is valid and the UE maintains the TA value; or if the temporary TAT expires, the UE no longer maintains the TA value.

(2) In case that the network side device configures the long-term TAT, in case that the timer is running, the TA is valid and the UE maintains the TA value. Before or in case that the timer expires, the network side device reconfigures another TA value for the UE, and the UE restarts the timer, and maintains the TA value during the running of the timer.

In an embodiment of the present application, the performing configuration for directly configuring the SCG to be in the deactivated state includes at least one of the followings:

upon performing SCG addition, configuring added SCG to be in the deactivated state directly;

upon performing SCG reconfiguration, configuring reconfigured SCG to be in the deactivated state directly;

upon performing conditional PSCell addition, configuring the SCG to be in the deactivated state directly;

upon performing PSCell change, configuring the SCG to be in the deactivated state directly;

upon reconfiguration with sync of PSCell, configuring the SCG to be in the deactivated state directly;

upon performing conditional PSCell change, configuring the SCG to be in the deactivated state directly;

upon performing RRC connection resume, configuring the SCG to be in the deactivated state directly;

upon performing PCell handover, configuring the SCG to be in the deactivated state directly; or upon reconfiguration with sync of PCell, configuring the SCG to be in the deactivated state directly.

In an embodiment, the SCG is configured to be in the deactivated state directly upon SCG addition (and/or SCG reconfiguration, and/or conditional PSCell addition, and/or PSCell change, and/or conditional PSCell change, and/or RRC connection resume, and/or reconfiguration with sync of PCell), which includes the following steps.

In step 1, in case that the network side device needs to configure SCG addition, if the network side device stores corresponding UE capabilities, the network side device directly queries whether the UE supports capabilities to configure the SCG to be in the deactivated state directly upon the SCG addition; or if the network side device does not store the corresponding UE capabilities, the network side device requests a core network to obtain the UE capabilities associated with the SCG deactivated state stored in the core network; or if neither the network side device nor the core network stores the corresponding UE capabilities, the network side device requests the UE to report the UE capabilities associated with the SCG deactivated state including at least whether the UE supports a capability of configuring the SCG to be in the deactivated state directly upon the SCG addition.

In step 2, in case that the UE supports the capability of configuring the SCG to be in the deactivated state directly upon the SCG addition, the network side device transmits, to the UE, an RRC reconfiguration message for configuring the SCG to the deactivated state directly upon the SCG addition.

In step 3, after receiving the RRC reconfiguration message for configuring the SCG to the deactivated state directly, the UE completes the SCG addition procedure, and configures the SCG to the deactivated state directly; otherwise, the UE may transition the SCG to the deactivated state through the operations in the embodiment of configuring the SCG to be in the deactivated state only after SCG addition.

It should be noted that taking SCG addition as an example, other procedures including SCG reconfiguration, and/or conditional PSCell addition, and/or PSCell change, and/or conditional PSCell change, and/or RRC connection resume, and/or reconfiguration with sync of PCell are similar, which are not repeated in the present application.

In an embodiment, the SCG is directly configured to the deactivated state upon reconfiguration with sync of PCell (and/or PCell change), which includes the following steps.

In step 1, in case that the network side device needs to configure the reconfiguration with sync of PCell, if the network side device stores corresponding UE capabilities, the network side device directly queries whether the UE supports capabilities for configuring the SCG to be in the deactivated state directly upon the reconfiguration with sync of PCell; or if the network side device does not store the corresponding UE capabilities, the network side device requests a core network to obtain the UE capabilities associated with the SCG deactivated state stored in the core network; or if neither the network side device nor the core network stores the corresponding UE capabilities, the network side device requests the UE to report the UE capabilities associated with the SCG deactivated state including at least whether the UE supports the UE capability to configure the SCG to be in the deactivated state directly upon the reconfiguration with sync of PCell.

In step 2, in case that the UE supports the capability to configuring the SCG to be in the deactivated state directly upon the reconfiguration with sync of PCell, the network side device transmits, to the UE, an RRC reconfiguration message for configuring the SCG to the deactivated state directly upon the reconfiguration with sync of PCell.

In step 3, after receiving the RRC reconfiguration message for configuring the SCG to the deactivated state directly, the UE completes the reconfiguration with sync of PCell and configures the SCG to the deactivated state directly. Otherwise, the UE may transition the SCG to the deactivated state through the operations in the embodiment of configuring the SCG to be in the deactivated state only after performing the reconfiguration with sync of PCell.

It should be noted that taking reconfiguration with sync of PCell as an example, other procedures including PCell change are similar, which are not repeated in the present application.

In an embodiment, the SCG is configured to be in the deactivated state directly in case of the RRC connection resume, which includes the following steps.

In step 1, in case that the network side device needs to configure RRC connection resume, if the network side device stores corresponding UE capabilities, the network side device directly queries whether the UE supports capabilities associated with configuring the SCG to be in the deactivated state directly upon the RRC connection resume; or if the network side device does not store the corresponding UE capabilities, the network side device requests a core network to obtain the UE capabilities associated with the SCG deactivated state stored in the core network; or if neither the network side device nor the core network stores the corresponding UE capabilities, the network side device requests the UE to report the UE capabilities associated with the SCG deactivated state including at least whether the UE supports the UE capability associated with configuring the SCG to be in the deactivated state directly upon the RRC connection resume.

In step 2, in case that the UE supports the capability associated with configuring the SCG to be in the deactivated state directly upon the RRC connection resume, the network side device transmits, to the UE, an RRCResume message or an RRCConnectionResume message for configuring the SCG to the deactivated state directly upon the RRC connection resume.

In step 3, after receiving the RRCResume message or the RRCConnectionResume message for configuring the SCG to the deactivated state directly, the UE completes the RRC connection resume procedure, and configures the SCG to the deactivated state directly. Otherwise, the UE may transition the SCG to the deactivated state through the operations in the embodiment of configuring the SCG to be in the deactivated state only after performing the RRC connection resume.

In an embodiment of the present application, the performing configuration associated with reconfiguration in case that the SCG is in the deactivated state includes at least one of the followings:

performing SCell addition in case that the SCG is in the deactivated state;

performing SCell release in case that the SCG is in the deactivated state;

performing SCell reconfiguration in case that the SCG is in the deactivated state;

performing PSCell change in case that the SCG is in the deactivated state;

performing reconfiguration with sync of PSCell in case that the SCG is in the deactivated state;

performing conditional PSCell change in case that the SCG is in the deactivated state;

performing SCG release in case that the SCG is in the deactivated state;

performing PSCell reconfiguration in case that the SCG is in the deactivated state;

performing PCell handover in case that the SCG is in the deactivated state; or performing reconfiguration with sync of PCell in case that the SCG is in the deactivated state.

In an embodiment, an SCell addition operation (and/or an SCell release operation, and/or an SCell reconfiguration operation) is performed in the SCG deactivated state, which includes the following steps.

In step 1, the network side device configures the SCG for the UE, and the SCG is in the deactivated state. In the step 1, in case that the network side device needs to configure the SCell addition operation, if the network side device stores corresponding UE capabilities, the network side device directly queries whether the UE supports capabilities for adding the SCell in the SCG deactivated state; or if the network side device does not store the corresponding UE capabilities, the network side device requests a core network to obtain the UE capabilities associated with the SCG deactivated state stored in the core network; or if neither the network side device nor the core network stores the corresponding UE capabilities, the network side device requests the UE to report the UE capabilities associated with the SCG deactivated state including at least whether the UE supports the capability for adding the SCell in the SCG deactivated state.

In step 2, in case that the UE supports the capability for adding the SCell in the SCG deactivated state, the network side device performs the SCell addition operation to complete the addition of the SCell.

In step 2-1, in case that the UE does not supports this capability, the network side device may only first transition the SCG to the activated state based on the operations in the embodiment of configuring the SCG to be in the deactivated state, and then complete the SCell addition operation.

It should be noted that taking SCell addition as an example, other procedures, including SCell release and/or SCell reconfiguration are similar, which are not repeated in the present application.

In an embodiment, the PSCell reconfiguration operation (and/or the PSCell change operation, and/or the conditional PSCell change operation, and/or the reconfiguration operation with sync of PSCell, and/or the SCG release operation) is performed in the SCG deactivated state, which includes the following steps.

In step 1, the network side device configures the SCG for the UE, and the SCG is in the deactivated state. In step 1, in case that the network side device needs to configure the PSCell reconfiguration operation, if the network side device stores corresponding UE capabilities, the network side device directly queries whether the UE supports capabilities associated with performing the PSCell reconfiguration in the SCG deactivated state; or if the network side device does not store the corresponding UE capabilities, the network side device requests a core network to obtain the UE capabilities associated with the SCG deactivated state stored in the core network; or if neither the network side device nor the core network stores the corresponding UE capabilities, the network side device requests the UE to report the UE capabilities associated with the SCG deactivated state including at least whether the UE supports the UE capability associated with performing the PSCell reconfiguration in the SCG deactivated state.

In step 2, in case that the UE has a capability associated with performing the PSCell reconfiguration in the SCG deactivated state, the network side device performs the PSCell reconfiguration operation to complete the PSCell reconfiguration.

In step 2-1, in case that the UE does not support this capability, the network side device may only hand over the SCG to the activated state based on the operation in the embodiment of configuring the SCG to be in the deactivated state, and then complete the PSCell reconfiguration operation.

It should be noted that taking PSCell reconfiguration as an example, other procedures, including PSCell change operation, and/or PSCell synchronous reconfiguration operation, and/or conditional PSCell change operation, and/or SCG release operation are similar, which are not repeated in the present application.

In an embodiment, a PCell handover operation (and/or a reconfiguration operation with sync of PCell) is performed in the SCG deactivated state, which includes the following steps.

In step 1, the network side device configures the SCG for the UE, and the SCG is in the deactivated state. In case that the network side device needs to configure the PCell handover, if the network side device stores corresponding UE capabilities, the network side device directly queries whether the UE supports capabilities associated with performing the PSCell reconfiguration in the SCG deactivated state; or if the network side device does not store the corresponding UE capabilities, the network side device requests a core network to obtain the UE capabilities associated with the SCG deactivated state stored in the core network; or if neither the network side device nor the core network stores the corresponding UE capabilities, the network side device requests the UE to report the UE capabilities associated with the SCG deactivated state including at least whether the UE supports the UE capability associated with performing the PCell handover in the SCG deactivated state.

In step 2, in case that the UE supports a capability associated with performing the PCell handover in the SCG deactivated state, the network side device performs the PCell handover operation to complete the PCell handover.

In step 2-1, in case that the UE does not support this capability, the network side device may only transition the SCG to the activated state based on the operations in the embodiment of configuring the SCG to be in the deactivated state, and then complete the PCell handover operation.

It should be noted that taking the PCell handover as an example, other procedures including PCell synchronous reconfiguration are similar, which are not repeated in the present application.

FIG. 2 is a second schematic flowchart of a method for processing user equipment (UE) capability information according to an embodiment of the present application. As shown in FIG. 2, the method for processing UE capability information according to an embodiment of the present application may be performed by a network side device, such as a base station, a core network element, etc. The method includes:

> step 201, obtaining first capability information reported from the UE, where the first capability information is UE capability information associated with a secondary cell group (SCG) deactivated state; and
> step 202, transmitting first configuration information to the UE, where the first configuration information is used to indicate the UE to perform configuration associated with the SCG deactivated state.

In an embodiment of the present application, before obtaining first capability information reported from the UE, the method further includes:

> transmitting a capability request message to the UE, where the capability request message includes first indication information for indicating the UE to report the first capability information.

In an embodiment of the present application, the first configuration information includes at least one of the followings:

> configuration of configuring the SCG to be in the deactivated state;
> configuration of configuring a state transition of the SCG;
> configuration associated with performing CSI-RS measurement and reporting in case that the SCG is in the deactivated state;
> configuration associated with performing RRM measurement and reporting in case that the SCG is in the deactivated state;
> configuration associated with performing RLM measurement and RLF reporting in case that the SCG is in the deactivated state;
> configuration associated with performing beam management in case that the SCG is in the deactivated state;
> configuration associated with performing SRS transmission in case that the SCG is in the deactivated state;
> configuration associated with maintaining uplink timing advance (TA) value in case that the SCG is in the deactivated state;
> configuration for directly configuring the SCG to be the deactivated state; or
> configuration associated with performing reconfiguration in case that the SCG is in the deactivated state.

In an embodiment of the present application, configuring the state transition of the SCG includes at least one of the followings:

> configuring the state of the SCG to transition from an activated state to a deactivated state; or
> configuring the state of the SCG to transition from a deactivated state to an activated state.

The first configuration information includes at least one of the followings:

> media access control-control element (MAC CE);
> downlink control information (DCI); or
> radio resource control (RRC).

In an embodiment of the present application, configuring the state transition of the SCG includes:

starting a first timer, and configuring the state of the SCG to transition from the deactivated state to the activated state; or starting a second timer, and configuring the state of the SCG to transition from the activated state to the deactivated state.

In an embodiment of the present application, performing configuration associated with the CSI-RS measurement and reporting in case that the SCG is in the deactivated state includes at least one of the followings:

periodically reporting CSI-RS measurement results through an MN side in case that the SCG is in the deactivated state;

semi-persistently reporting CSI-RS measurement results through an MN side in case that the SCG is in the deactivated state;

aperiodically reporting CSI-RS measurement results through an MN side in case that the SCG is in the deactivated state; or reporting CSI-RS measurement results through a pre-configured SCG resource in case that the SCG is in the deactivated state.

In an embodiment of the present application, performing configuration associated with RRM measurement and reporting in case that the SCG is in the deactivated state includes at least one of the followings:

performing RRM measurement and reporting in case that the SCG is in the deactivated state;

performing relaxed RRM measurement in case that the SCG is in the deactivated state;

performing RRM measurement based on measurement configuration configured on an SCG side in case that the SCG is in the deactivated state; or performing relaxed RRM measurement based on measurement configuration configured on an SCG side in case that the SCG is in the deactivated state.

In an embodiment of the present application, performing configuration associated with RLM measurement and RLF reporting in case that the SCG is in the deactivated state includes at least one of the followings:

performing RLM measurement in case that the SCG is in the deactivated state;

performing RLF reporting in case that the SCG is in the deactivated state; or performing RLM measurement and RLF reporting in case that the SCG is in the deactivated state.

In an embodiment of the present application, performing configuration associated with the beam management in case that the SCG is in the deactivated state includes at least one of the followings:

performing PSCell beam measurement and reporting in case that the SCG is in the deactivated state;

performing PSCell beam failure detection in case that the SCG is in the deactivated state;

performing PSCell beam failure recovery in case that the SCG is in the deactivated state;

performing SCG SCell beam measurement and reporting in case that the SCG is in the deactivated state;

performing SCG SCell beam failure detection in case that the SCG is in the deactivated state; or performing SCG SCell beam failure recovery in case that the SCG is in the deactivated state.

In an embodiment of the present application, performing configuration associated with SRS transmission in case that the SCG is in the deactivated state includes at least one of the followings:

performing the SRS transmission in case that the SCG is in the deactivated state; or performing relaxed SRS transmission in case that the SCG is in the deactivated state.

In an embodiment of the present application, performing configuration associated with maintaining the uplink TA value in case that the SCG is in the deactivated state includes at least one of the followings:

maintaining the uplink TA value in case that the SCG is in the deactivated state; or running a temporary uplink TAT in case that the SCG is in the deactivated state.

In an embodiment of the present application, performing configuration for directly configuring the SCG to be in the deactivated state includes at least one of the followings:

upon performing SCG addition, configuring added SCG to be in the deactivated state directly;

upon performing SCG reconfiguration, configuring reconfigured SCG to be in the deactivated state directly;

upon performing conditional PSCell addition, configuring the SCG to be in the deactivated state directly;

upon performing PSCell change, configuring the SCG to be in the deactivated state directly;

upon reconfiguration with sync of PSCell, configuring the SCG to be in the deactivated state directly;

upon performing conditional PSCell change, configuring the SCG to be in the deactivated state directly;

upon performing RRC connection resume, configuring the SCG to be in the deactivated state directly;

upon performing PCell handover, configuring the SCG to be in the deactivated state directly; or upon reconfiguration with sync of PCell, configuring the SCG to be in the deactivated state directly.

In an embodiment of the present application, performing configuration associated with reconfiguration in case that the SCG is in the deactivated state includes at least one of the followings:

performing SCell addition in case that the SCG is in the deactivated state;

performing SCell release in case that the SCG is in the deactivated state;

performing SCell reconfiguration in case that the SCG is in the deactivated state;

performing PSCell change in case that the SCG is in the deactivated state;

performing reconfiguration with sync of PSCell in case that the SCG is in the deactivated state;

performing conditional PSCell change in case that the SCG is in the deactivated state;

performing SCG release in case that the SCG is in the deactivated state;

performing PSCell reconfiguration in case that the SCG is in the deactivated state;

performing PCell handover in case that the SCG is in the deactivated state; or performing reconfiguration with sync of PCell in case that the SCG is in the deactivated state.

It should be noted here that in the method for processing UE capability information according to the embodiments of the present application, the above-mentioned embodiments in which the method is performed by the UE may also be applied to the network side device, and may achieve the same effects. Embodiments and beneficial effects in the embodiments that are the same as those in the above corresponding method embodiments are not described in detail.

FIG. 3 is a schematic structural diagram of a user equipment (UE) according to an embodiment of the present application. As shown in FIG. 3, the UE includes a memory 320, a transceiver 300, and a processor 310, in which:

the memory 320 is used to store a computer program; the transceiver 300 is used to transmit and receive data under a control of the processor; the processor 310 is used to read the computer program in the memory 320. The computer program, when executed by the processor, causes the UE to perform the following operations:

reporting first capability information to a network side device, where the first capability information is UE capability information associated with a secondary cell group (SCG) deactivated state;

receiving first configuration information transmitted from the network side device, where the first configuration information is used to indicate the UE to perform configuration associated with the SCG deactivated state; and performing the configuration associated with the SCG deactivated state.

The transceiver 300 is used to receive and transmit data under the control of the processor 310.

In FIG. 3, a bus architecture may include any number of interconnected buses and bridges, which are linked together through various circuits of one or more processors represented by processor 310 and one or more memories represented by the memory 320. The bus architecture may also link together various other circuits, such as peripherals, voltage regulators, and power management circuits. The bus interface provides an interface. Transceiver 300 may be multiple elements, i.e., including a transmitter and a receiver, units for providing communication with various other devices over transmission media including wireless channels, wired channels, fiber optic cables, and the like. For different user equipment, the user interface 330 may also be an interface capable of externally or internally connecting the required equipment, and the connected equipment includes, but not limited to, a keypad, a display, a speaker, a microphone, a joystick, and the like.

The processor 310 is responsible for managing the bus architecture and general processing, and the memory 320 may store data used by the processor 310 when performing operations.

The processor 310 may be a central processing unit (CPU), an application specific integrated circuit (ASIC), a field-programmable gate array (FPGA), or a complex programmable logic device (CPLD), the processor may also use a multi-core architecture.

The processor is configured to perform any one of the methods of the embodiments of the present application based on the obtained executable instructions by calling the computer program stored in the memory. The processor and memory may also be physically separated.

In an embodiment of the present application, before reporting the first capability information to the network side device, the method further includes:

obtaining a capability request message transmitted from the network side device, where the capability request message includes first indication information for indicating the UE to report the first capability information.

In an embodiment of the present application, the first capability information includes at least one of the followings:

whether the UE supports a capability associated with the SCG deactivated state;

whether the UE supports a capability associated with SCG state transition;

whether the UE supports a capability associated with performing channel state information reference signal (CSI-RS) measurement and reporting in case that the SCG is in a deactivated state;

whether the UE supports a capability associated with performing radio resource management (RRM) measurement and reporting in case that the SCG is in a deactivated state;

whether the UE supports a capability associated with performing radio link monitoring (RLM) measurement and radio link failure (RLF) reporting in case that the SCG is in a deactivated state;

whether the UE supports a capability associated with performing beam management in case that the SCG is in a deactivated state;

whether the UE supports a capability associated with performing sounding reference signal (SRS) transmission in case that the SCG is in a deactivated state;

whether the UE supports a capability associated with maintaining an uplink timing advance (TA) value in case that the SCG is in a deactivated state;

whether the UE supports a capability to directly configure the SCG to be in a deactivated state; or whether the UE supports a capability associated with performing reconfiguration in case that the SCG is in a deactivated state.

In an embodiment of the present application, the first capability information is distinguished by at least one of the followings:

bands supported by the UE;

band combinations supported by the UE;

duplex modes supported by the UE;

transmission frequency ranges supported by the UE;

types of radio access networks supported by the UE;

types of multi-connectivity network architectures supported by the UE;

types of radio access networks for a master node (MN) supported by the UE; or types of radio access networks for a secondary node (SN) supported by the UE.

In an embodiment of the present application, the first capability information includes at least one type of indication information for the capability associated with SCG state transition, where the indication information includes at least one of the followings:

whether the UE supports performing SCG state transition through a medium access control layer control element (MAC CE);

whether the UE supports performing SCG state transition through downlink control information (DCI);

whether the UE supports performing the SCG state transition through radio resource control (RRC); or whether the UE supports performing the SCG state transition through a timer.

In an embodiment of the present application, the first capability information includes at least one type of indication information for the capability associated with performing CSI-RS measurement and reporting in case that the SCG is in the deactivated state, where the indication information includes at least one of the followings:

whether the UE supports periodically reporting CSI-RS measurement results through an MN side in case that the SCG is in the deactivated state;

whether the UE supports semi-persistently reporting CSI-RS measurement results through an MN side in case that the SCG is in the deactivated state;

whether the UE supports aperiodically reporting CSI-RS measurement results through an MN side in case that the SCG is in the deactivated state; or whether the UE supports reporting CSI-RS measurement results through a pre-configured SCG resource in case that the SCG is in the deactivated state.

In an embodiment of the present application, the first capability information includes at least one type of indication information for the capability associated with performing RRM measurement and reporting in case that SCG is in the deactivated state, where the indication information includes at least one of the followings:

whether the UE supports performing RRM measurement in case that the SCG is in the deactivated state;

whether the UE supports performing relaxed RRM measurement in case that the SCG is in the deactivated state;

whether the UE supports performing RRM measurement based on measurement configuration configured on the SCG side in case that the SCG is in the deactivated state; or whether the UE supports performing relaxed RRM measurement based on measurement configuration configured on the SCG side in case that the SCG is in the deactivated state.

In an embodiment of the present application, the first capability information includes at least one type of indication information for the capability associated with performing RLM measurement and RLF reporting in case that SCG is in a deactivated state, where the indication information includes at least one of the followings:

whether the UE supports performing RLM measurement in case that the SCG is in the deactivated state;

whether the UE supports performing RLF reporting in case that the SCG is in the deactivated state; or whether the UE supports performing RLM measurement and RLF reporting in case that the SCG is in the deactivated state.

In an embodiment of the present application, the first capability information includes at least one type of indication information for the capability associated with performing beam management in case that SCG is in the deactivated state, where the indication information includes at least one of the followings:

whether the UE supports performing PSCell beam measurement and reporting in case that the SCG is in the deactivated state;

whether the UE supports performing PSCell beam failure detection in case that the SCG is in the deactivated state;

whether the UE supports performing PSCell beam failure recovery in case that the SCG is in the deactivated state;

whether the UE supports performing SCG SCell beam measurement and reporting in case that the SCG is in the deactivated state;

whether the UE supports performing SCG SCell beam failure detection in case that the SCG is in the deactivated state; or whether the UE supports performing SCG SCell beam failure recovery in case that the SCG is in the deactivated state.

In an embodiment of the present application, the first capability information includes at least one type of indication information for the capability associated with performing SRS transmission in case that SCG is in the deactivated state, where the indication information includes at least one of the followings:

whether the UE supports performing SRS transmission in case that the SCG is in the deactivated state; or whether the UE supports performing relaxed SRS transmission in case that the SCG is in the deactivated state.

In an embodiment of the present application, the first capability information includes at least one type of indication information for the capability associated with maintaining the uplink TA value in case that SCG is in the deactivated state, where the indication information includes at least one of the followings:

whether the UE supports maintaining the TA advance value in case that the SCG is in the deactivated state; or whether the UE supports running a temporary uplink timing advance timer (TAT) in case that the SCG is in the deactivated state.

In an embodiment of the present application, the first capability information includes at least one type of indication information for the capability to directly configure the SCG to be in the deactivated state, where the indication information includes at least one of the followings:

whether the UE supports directly configuring the SCG to be in the deactivated state in case of performing SCG addition;

whether the UE supports directly configuring the SCG to be in the deactivated state in case of performing SCG reconfiguration;

whether the UE supports directly configuring the SCG to be in the deactivated state in case of performing conditional PSCell addition;

whether the UE supports directly configuring the SCG to be in the deactivated state in case of performing PSCell change;

whether the UE supports directly configuring the SCG to be in the deactivated state in case of performing reconfiguration with sync of PSCell;

whether the UE supports directly configuring the SCG to be in the deactivated state in case of performing conditional PSCell change;

whether the UE supports directly configuring the SCG to be in the deactivated state in case of performing RRC connection resume;

whether the UE supports directly configuring the SCG to be in the deactivated state in case of performing primary cell (PCell) handover; or whether the UE supports directly configuring the SCG to be in the deactivated state in case of performing reconfiguration with sync of PCell.

In an embodiment of the present application, the first capability information includes at least one type of indication information for the capability associated with performing reconfiguration in case that the SCG is in the deactivated state, where the indication information includes at least one of the followings:

whether the UE supports performing SCell addition in case that the SCG is in the deactivated state;

whether the UE supports performing SCell release in case that the SCG is in the deactivated state;

whether the UE supports performing SCell reconfiguration in case that the SCG is in the deactivated state;

whether the UE supports performing PSCell change in case that the SCG is in the deactivated state;

whether the UE supports performing reconfiguration with sync of PSCell in case that the SCG is in the deactivated state;

whether the UE supports performing conditional PSCell change in case that the SCG is in the deactivated state;

whether the UE supports performing SCG release in case that the SCG is in the deactivated state;

whether the UE supports performing SCG reconfiguration in case that the SCG is in the deactivated state;

whether the UE supports performing PCell handover in case that the SCG is in the deactivated state; or whether the UE supports performing reconfiguration with sync of PCell in case that the SCG is in the deactivated state.

In an embodiment of the present application, the performing the configuration associated with the SCG deactivated state includes at least one of the followings:

configuring the SCG to be in the deactivated state;

configuring a state transition of the SCG;

performing configuration associated with CSI-RS measurement and reporting in case that the SCG is in the deactivated state;

performing configuration associated with RRM measurement and reporting in case that the SCG is in the deactivated state;

performing configuration associated with RLM measurement and RLF reporting in case that the SCG is in the deactivated state;

performing configuration associated with beam management in case that the SCG is in the deactivated state;

performing configuration associated with SRS transmission in case that the SCG is in the deactivated state;

performing configuration associated with maintaining uplink TA value in case that the SCG is in the deactivated state;

performing configuration for directly configuring the SCG to be the deactivated state; or performing configuration associated with reconfiguration in case that the SCG is in the deactivated state.

In an embodiment of the present application, the configuring the state transition of the SCG includes at least one of the followings:

configuring the state of the SCG to transition from an activated state to a deactivated state; or configuring the state of the SCG to transition from a deactivated state to an activated state.

The first configuration information includes at least one of the followings:

media access control-control element (MAC CE);

downlink control information (DCI); or radio resource control (RRC).

In an embodiment of the present application, the configuring the state transition of the SCG includes:

starting a first timer, and configuring the state of the SCG to transition from the deactivated state to the activated state; or starting a second timer, and configuring the state of the SCG to transition from the activated state to the deactivated state.

In an embodiment of the present application, the performing configuration associated with the CSI-RS measurement and reporting in case that the SCG is in the deactivated state includes at least one of the followings:

periodically reporting CSI-RS measurement results through an MN side in case that the SCG is in the deactivated state;

semi-persistently reporting CSI-RS measurement results through an MN side in case that the SCG is in the deactivated state;

aperiodically reporting CSI-RS measurement results through an MN side in case that the SCG is in the deactivated state; or reporting CSI-RS measurement results through a pre-configured SCG resource in case that the SCG is in the deactivated state.

In an embodiment of the present application, the performing configuration associated with the RRM measurement and reporting in case that the SCG is in the deactivated state includes at least one of the followings:

performing RRM measurement and reporting in case that the SCG is in the deactivated state;

performing relaxed RRM measurement in case that the SCG is in the deactivated state;

performing RRM measurement based on measurement configuration configured on an SCG side in case that the SCG is in the deactivated state; or performing relaxed RRM measurement based on measurement configuration configured on an SCG side in case that the SCG is in the deactivated state.

In an embodiment of the present application, the performing configuration associated with the RLM measurement and the RLF reporting in case that the SCG is in the deactivated state includes at least one of the followings:

performing RLM measurement in case that the SCG is in the deactivated state;

performing RLF reporting in case that the SCG is in the deactivated state; or performing RLM measurement and RLF reporting in case that the SCG is in the deactivated state.

In an embodiment of the present application, the performing configuration associated with the beam management in case that the SCG is in the deactivated state includes at least one of the followings:

performing PSCell beam measurement and reporting in case that the SCG is in the deactivated state;

performing PSCell beam failure detection in case that the SCG is in the deactivated state;

performing PSCell beam failure recovery in case that the SCG is in the deactivated state;

performing SCG SCell beam measurement and reporting in case that the SCG is in the deactivated state;

performing SCG SCell beam failure detection in case that the SCG is in the deactivated state; or performing SCG SCell beam failure recovery in case that the SCG is in the deactivated state.

In an embodiment of the present application, the performing configuration associated with the SRS transmission in case that the SCG is in the deactivated state includes at least one of the followings:

performing SRS transmission in case that the SCG is in the deactivated state; or performing relaxed SRS transmission in case that the SCG is in the deactivated state.

In an embodiment of the present application, the performing configuration associated with maintaining the uplink TA value in case that the SCG is in the deactivated state includes at least one of the followings:

maintaining the uplink TA value in case that the SCG is in the deactivated state; or running a temporary uplink TAT in case that the SCG is in the deactivated state.

In an embodiment of the present application, the performing configuration for directly configuring the SCG to be in the deactivated state includes at least one of the followings:

upon performing SCG addition, configuring added SCG to be in the deactivated state directly;

upon performing SCG reconfiguration, configuring recon-
figured SCG to be in the deactivated state directly;

upon performing conditional PSCell addition, configuring
the SCG to be in the deactivated state directly;

upon performing PSCell change, configuring the SCG to
be in the deactivated state directly;

upon reconfiguration with sync of PSCell, configuring the
SCG to be in the deactivated state directly;

upon performing conditional PSCell change, configuring
the SCG to be in the deactivated state directly;

upon performing RRC connection resume, configuring
the SCG to be in the deactivated state directly;

upon performing PCell handover, configuring the SCG to
be in the deactivated state directly; or upon reconfiguration with sync of PCell, configuring the
SCG to be in the deactivated state directly.

In an embodiment of the present application, the perform-
ing configuration associated with reconfiguration in case that
the SCG is in the deactivated state includes at least one of
the followings:

performing SCell addition in case that the SCG is in the
deactivated state;

performing SCell release in case that the SCG is in the
deactivated state;

performing SCell reconfiguration in case that the SCG is
in the deactivated state;

performing PSCell change in case that the SCG is in the
deactivated state;

performing reconfiguration with sync of PSCell in case
that the SCG is in the deactivated state;

performing conditional PSCell change in case that the
SCG is in the deactivated state;

performing SCG release in case that the SCG is in the
deactivated state;

performing PSCell reconfiguration in case that the SCG is
in the deactivated state;

performing PCell handover in case that the SCG is in the
deactivated state; or performing reconfiguration with sync of PCell in case that
the SCG is in the deactivated state.

It should be noted here that the above-mentioned UE
according to the embodiments of the present application
may implement all the method steps implemented by the
above-mentioned method embodiments performed by the
UE, and may achieve the same effect. The same parts and
beneficial effects as the same method embodiments are not
repeated in the present application.

FIG. 4 is a schematic structural diagram of a network side
device according to an embodiment of the present applica-
tion. As shown in FIG. 4, the network side device includes
a memory 420, a transceiver 400, and a processor 410, in
which:

the memory 420 is configured to store a computer pro-
gram; the transceiver 400 is configured to transmit and
receive data under a control of the processor; the
processor 410 is configured to read the computer pro-
gram in the memory 420. The computer program, when
executed by the processor, causes the network side
device to perform the following operations:

obtaining first capability information reported from the
UE, where the first capability information is UE capa-
bility information associated with a secondary cell
group (SCG) deactivated state; and transmitting first configuration information to the UE,
where the first configuration information is used to
indicate the UE to perform configuration associated
with the SCG deactivated state.

The transceiver 400 is used to receive and transmit data
under the control of the processor 410.

In FIG. 4, a bus architecture may include any number of
interconnected buses and bridges, which are linked together
through various circuits of one or more processors repre-
sented by processor 410 and one or more memories repre-
sented by the memory 420. The bus architecture may also
link together various other circuits, such as peripherals,
voltage regulators, and power management circuits. The bus
interface provides an interface. Transceiver 400 may be
multiple elements, i.e., including a transmitter and a
receiver, units for providing communication with various
other devices over transmission media including wireless
channels, wired channels, fiber optic cables, and the like.
The processor 410 is responsible for managing the bus
architecture and general processing, and the memory 420
may store data used by the processor 410 when performing
operations.

The processor 410 may be a central processing unit
(CPU), an application specific integrated circuit (ASIC), a
field-programmable gate array (FPGA), or a complex pro-
grammable logic device (CPLD), the processor may also use
a multi-core architecture.

In an embodiment of the present application, before
obtaining first capability information reported from the UE,
the method further includes:

transmitting a capability request message to the UE,
where the capability request message includes first
indication information for indicating the UE to report
the first capability information.

In an embodiment of the present application, the first
configuration information includes at least one of the fol-
lowings:

configuration of configuring the SCG to be in the deac-
tivated state;

configuration of configuring a state transition of the SCG;

configuration associated with performing CSI-RS mea-
surement and reporting in case that the SCG is in the
deactivated state;

configuration associated with performing RRM measure-
ment and reporting in case that the SCG is in the
deactivated state;

configuration associated with performing RLM measure-
ment and RLF reporting in case that the SCG is in the
deactivated state;

configuration associated with performing beam manage-
ment in case that the SCG is in the deactivated state;

configuration associated with performing SRS transmis-
sion in case that the SCG is in the deactivated state;

configuration associated with maintaining uplink TA
value in case that the SCG is in the deactivated state;

configuration for directly configuring the SCG to be the
deactivated state; or configuration associated with per-
forming reconfiguration in case that the SCG is in the
deactivated state.

In an embodiment of the present application, configuring
the state transition of the SCG includes at least one of the
followings:

configuring the state of the SCG to transition from an
activated state to a deactivated state; or configuring the state of the SCG to transition from a
deactivated state to an activated state.

The first configuration information includes at least one of
the followings:

media access control-control element (MAC CE);

downlink control information (DCI); or radio resource
control (RRC).

In an embodiment of the present application, configuring the state transition of the SCG includes:

starting a first timer, and configuring the state of the SCG to transition from the deactivated state to the activated state; or starting a second timer, and configuring the state of the SCG to transition from the activated state to the deactivated state.

In an embodiment of the present application, performing configuration associated with CSI-RS measurement and reporting in case that the SCG is in the deactivated state includes at least one of the followings:

periodically reporting CSI-RS measurement results through an MN side in case that the SCG is in the deactivated state;

semi-persistently reporting CSI-RS measurement results through an MN side in case that the SCG is in the deactivated state;

aperiodically reporting CSI-RS measurement results through an MN side in case that the SCG is in the deactivated state; or reporting CSI-RS measurement results through a pre-configured SCG resource in case that the SCG is in the deactivated state.

In an embodiment of the present application, performing configuration associated with the RRM measurement and reporting in case that the SCG is in the deactivated state includes at least one of the followings:

performing RRM measurement and reporting in case that the SCG is in the deactivated state;

performing relaxed RRM measurement in case that the SCG is in the deactivated state;

performing RRM measurement based on measurement configuration configured on an SCG side in case that the SCG is in the deactivated state; or performing relaxed RRM measurement based on measurement configuration configured on an SCG side in case that the SCG is in the deactivated state.

In an embodiment of the present application, performing configuration associated with the RLM measurement and the RLF reporting in case that the SCG is in the deactivated state includes at least one of the followings:

performing RLM measurement in case that the SCG is in the deactivated state;

performing RLF reporting in case that the SCG is in the deactivated state; or performing RLM measurement and RLF reporting in case that the SCG is in the deactivated state.

In an embodiment of the present application, performing configuration associated with beam management in case that the SCG is in the deactivated state includes at least one of the followings:

performing PSCell beam measurement and reporting in case that the SCG is in the deactivated state;

performing PSCell beam failure detection in case that the SCG is in the deactivated state;

performing PSCell beam failure recovery in case that the SCG is in the deactivated state;

performing SCG SCell beam measurement and reporting in case that the SCG is in the deactivated state;

performing SCG SCell beam failure detection in case that the SCG is in the deactivated state; or performing SCG SCell beam failure recovery in case that the SCG is in the deactivated state.

In an embodiment of the present application, performing configuration associated with the SRS transmission in case that the SCG is in the deactivated state includes at least one of the followings:

performing SRS transmission in case that the SCG is in the deactivated state; or performing relaxed SRS transmission in case that the SCG is in the deactivated state.

In an embodiment of the present application, performing configuration associated with maintaining the uplink TA value in case that the SCG is in the deactivated state includes at least one of the followings:

maintaining the uplink TA value in case that the SCG is in the deactivated state; or running a temporary uplink TAT in case that the SCG is in the deactivated state.

In an embodiment of the present application, performing configuration for directly configuring the SCG to be in the deactivated state includes at least one of the followings:

upon performing SCG addition, configuring added SCG to be in the deactivated state directly;

upon performing SCG reconfiguration, configuring reconfigured SCG to be in the deactivated state directly;

upon performing conditional PSCell addition, configuring the SCG to be in the deactivated state directly;

upon performing PSCell change, configuring the SCG to be in the deactivated state directly;

upon reconfiguration with sync of PSCell, configuring the SCG to be in the deactivated state directly;

upon performing conditional PSCell change, configuring the SCG to be in the deactivated state directly;

upon performing RRC connection resume, configuring the SCG to be in the deactivated state directly;

upon performing PCell handover, configuring the SCG to be in the deactivated state directly; or upon reconfiguration with sync of PCell, configuring the SCG to be in the deactivated state directly.

In an embodiment of the present application, performing configuration associated with reconfiguration in case that the SCG is in the deactivated state includes at least one of the followings:

performing SCell addition in case that the SCG is in the deactivated state;

performing SCell release in case that the SCG is in the deactivated state;

performing SCell reconfiguration in case that the SCG is in the deactivated state;

performing PSCell change in case that the SCG is in the deactivated state;

performing reconfiguration with sync of PSCell in case that the SCG is in the deactivated state;

performing conditional PSCell change in case that the SCG is in the deactivated state;

performing SCG release in case that the SCG is in the deactivated state;

performing PSCell reconfiguration in case that the SCG is in the deactivated state;

performing PCell handover in case that the SCG is in the deactivated state; or performing reconfiguration with sync of PCell in case that the SCG is in the deactivated state.

It should be noted here that the above-mentioned network side device according to the embodiments of the present application may implement all the method steps implemented by the above-mentioned method embodiments performed by the network side device, and may achieve the same effect. The same parts and beneficial effects as the same method embodiments are not repeated in the present application.

Figure 5:
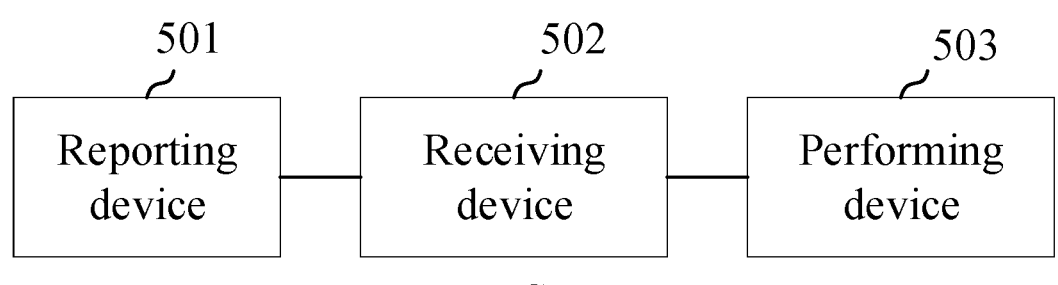
FIG. 5 is a first schematic structural diagram of an apparatus for processing UE capability information according to an embodiment of the present application.

FIG. 5 is a first schematic structural diagram of an apparatus for processing user equipment (UE) capability information according to an embodiment of the present application. As shown in FIG. 5, the apparatus for processing the UE capability information includes a reporting device 501, a receiving device 502 and a performing device 503.

The reporting device 501 is used to report first capability information to a network side device, where the first capability information is UE capability information associated with a secondary cell group (SCG) deactivated state. The receiving device 502 is used to receive first configuration information transmitted from the network side device, where the first configuration information is used to indicate the UE to perform configuration associated with the SCG deactivated state. The performing device 503 is used to perform the configuration associated with the SCG deactivated state.

In an embodiment of the present application, the apparatus for processing the UE capability information further includes:

a first obtaining device, used to obtain a capability request message transmitted from the network side device, where the capability request message includes first indication information for indicating the UE to report the first capability information.

In an embodiment of the present application, the first capability information includes at least one of the followings:

whether the UE supports a capability associated with the SCG deactivated state;

whether the UE supports a capability associated with SCG state transition;

whether the UE supports a capability associated with performing channel state information reference signal (CSI-RS) measurement and reporting in case that the SCG is in a deactivated state;

whether the UE supports a capability associated with performing radio resource management (RRM) measurement and reporting in case that the SCG is in a deactivated state;

whether the UE supports a capability associated with performing radio link monitoring (RLM) measurement and radio link failure (RLF) reporting in case that the SCG is in a deactivated state;

whether the UE supports a capability associated with performing beam management in case that the SCG is in a deactivated state;

whether the UE supports a capability associated with performing sounding reference signal (SRS) transmission in case that the SCG is in a deactivated state;

whether the UE supports a capability associated with maintaining an uplink timing advance (TA) value in case that the SCG is in a deactivated state;

whether the UE supports a capability to directly configure the SCG to be in a deactivated state; or whether the UE supports a capability associated with performing reconfiguration in case that the SCG is in a deactivated state.

In an embodiment of the present application, the first capability information is distinguished by at least one of the followings:

bands supported by the UE;

band combinations supported by the UE;

duplex modes supported by the UE;

transmission frequency ranges supported by the UE;

types of radio access networks supported by the UE;

types of multi-connectivity network architectures supported by the UE;

types of radio access networks for a master node (MN) supported by the UE; or types of radio access networks for a secondary node (SN) supported by the UE.

In an embodiment of the present application, the first capability information includes at least one type of indication information for the capability associated with SCG state transition, where the indication information includes at least one of the followings:

whether the UE supports performing the SCG state transition through a medium access control layer control element (MAC CE);

whether the UE supports performing the SCG state transition through downlink control information (DCI);

whether the UE supports performing the SCG state transition through RRC; or whether the UE supports performing the SCG state transition through a timer.

In an embodiment of the present application, the first capability information includes at least one type of indication information for the capability associated with performing CSI-RS measurement and reporting in case that the SCG is in the deactivated state, where the indication information includes at least one of the followings:

whether the UE supports periodically reporting CSI-RS measurement results through an MN side in case that the SCG is in the deactivated state;

whether the UE supports semi-persistently reporting CSI-RS measurement results through an MN side in case that the SCG is in the deactivated state;

whether the UE supports aperiodically reporting CSI-RS measurement results through an MN side in case that the SCG is in the deactivated state; or whether the UE supports reporting CSI-RS measurement results through a pre-configured SCG resource in case that the SCG is in the deactivated state.

In an embodiment of the present application, the first capability information includes at least one type of indication information for the capability associated with performing RRM measurement and reporting in case that SCG is in the deactivated state, where the indication information includes at least one of the followings:

whether the UE supports performing RRM measurement in case that the SCG is in the deactivated state;

whether the UE supports performing relaxed RRM measurement in case that the SCG is in the deactivated state;

whether the UE supports performing RRM measurement based on measurement configuration configured on an SCG side in case that the SCG is in the deactivated state; or whether the UE supports performing relaxed RRM measurement based on measurement configuration configured on an SCG side in case that the SCG is in the deactivated state.

In an embodiment of the present application, the first capability information includes at least one type of indication information for the capability associated with performing RLM measurement and RLF reporting in case that SCG is in the deactivated state, where the indication information includes at least one of the followings:

whether the UE supports performing RLM measurement in case that the SCG is in the deactivated state;

whether the UE supports performing RLF reporting in case that the SCG is in the deactivated state; or whether the UE supports performing RLM measurement and RLF reporting in case that the SCG is in the deactivated state.

In an embodiment of the present application, the first capability information includes at least one type of indication information for the capability associated with performing beam management in case that SCG is in a deactivated state, where the indication information includes at least one of the followings:

whether the UE supports performing PSCell beam measurement and reporting in case that the SCG is in the deactivated state;

whether the UE supports performing PSCell beam failure detection in case that the SCG is in the deactivated state;

whether the UE supports performing PSCell beam failure recovery in case that the SCG is in the deactivated state;

whether the UE supports performing SCG SCell beam measurement and reporting in case that the SCG is in the deactivated state;

whether the UE supports performing SCG SCell beam failure detection in case that the SCG is in the deactivated state; or whether the UE supports performing SCG SCell beam failure recovery in case that the SCG is in the deactivated state.

In an embodiment of the present application, the first capability information includes at least one type of indication information for the capability associated with performing SRS transmission in case that SCG is in the deactivated state, where the indication information includes at least one of the followings:

whether the UE supports performing SRS transmission in case that the SCG is in the deactivated state; or whether the UE supports performing relaxed SRS transmission in case that the SCG is in the deactivated state.

In an embodiment of the present application, the first capability information includes at least one type of indication information for the capability associated with maintaining the uplink timing advance value in case that SCG is in the deactivated state, where the indication information includes at least one of the followings:

whether the UE supports maintaining the uplink TA value in case that the SCG is in the deactivated state; or whether the UE supports running a temporary uplink timing advance timer (TAT) in case that the SCG is in the deactivated state.

In an embodiment of the present application, the first capability information includes at least one type of indication information for the capability to directly configure the SCG to be in the deactivated state, where the indication information includes at least one of the followings:

whether the UE supports directly configuring the SCG to be in the deactivated state in case of performing SCG addition;

whether the UE supports directly configuring the SCG to be in the deactivated state in case of performing SCG reconfiguration;

whether the UE supports directly configuring the SCG to be in the deactivated state in case of performing conditional PSCell addition;

whether the UE supports directly configuring the SCG to be in the deactivated state in case of performing PSCell change;

whether the UE supports directly configuring the SCG to be in the deactivated state in case of performing reconfiguration with sync of PSCell;

whether the UE supports directly configuring the SCG to be in the deactivated state in case of performing conditional PSCell change;

whether the UE supports directly configuring the SCG to be in the deactivated state in case of performing RRC connection resume;

whether the UE supports directly configuring the SCG to be in the deactivated state in case of performing primary cell (PCell) handover; or whether the UE supports directly configuring the SCG to be in the deactivated state in case of performing reconfiguration with sync of PCell.

In an embodiment of the present application, the first capability information includes at least one type of indication information for the capability associated with performing reconfiguration in case that SCG is in the deactivated state, where the indication information includes at least one of the followings:

whether the UE supports performing SCell addition in case that the SCG is in the deactivated state;

whether the UE supports performing SCell release in case that the SCG is in the deactivated state;

whether the UE supports performing SCell reconfiguration in case that the SCG is in the deactivated state;

whether the UE supports performing PSCell change in case that the SCG is in the deactivated state;

whether the UE supports performing reconfiguration with sync of PSCell in case that the SCG is in the deactivated state;

whether the UE supports performing conditional PSCell change in case that the SCG is in the deactivated state;

whether the UE supports performing SCG release in case that the SCG is in the deactivated state;

whether the UE supports performing SCG reconfiguration in case that the SCG is in the deactivated state;

whether the UE supports performing PCell handover in case that the SCG is in the deactivated state; or whether the UE supports performing reconfiguration with sync of PCell in case that the SCG is in the deactivated state.

In an embodiment of the present application, the performing the configuration associated with the SCG deactivated state includes at least one of the followings:

configuring the SCG to be in the deactivated state;

configuring a state transition of the SCG;

performing configuration associated with CSI-RS measurement and reporting in case that the SCG is in the deactivated state;

performing configuration associated with RRM measurement and reporting in case that the SCG is in the deactivated state;

performing configuration associated with RLM measurement and RLF reporting in case that the SCG is in the deactivated state;

performing configuration associated with beam management in case that the SCG is in the deactivated state;

performing configuration associated with SRS transmission in case that the SCG is in the deactivated state;

performing configuration associated with maintaining uplink TA value in case that the SCG is in the deactivated state;

performing configuration for directly configuring the SCG to be the deactivated state; or performing configuration associated with reconfiguration in case that the SCG is in the deactivated state.

In an embodiment of the present application, the configuring the state transition of the SCG includes at least one of the followings:

configuring the state of the SCG to transition from an activated state to a deactivated state; or configuring the state of the SCG to transition from a deactivated state to an activated state.

The first configuration information includes at least one of the followings:

media access control-control element (MAC CE);

downlink control information (DCI); or radio resource control (RRC).

In an embodiment of the present application, the configuring the state transition of the SCG includes:

starting a first timer, and configuring the state of the SCG to transition from the deactivated state to the activated state; or starting a second timer, and configuring the state of the SCG to transition from the activated state to the deactivated state.

In an embodiment of the present application, the performing configuration associated with the CSI-RS measurement and reporting in case that the SCG is in the deactivated state includes at least one of the followings:

periodically reporting CSI-RS measurement results through an MN side in case that the SCG is in the deactivated state;

semi-persistently reporting CSI-RS measurement results through an MN side in case that the SCG is in the deactivated state;

aperiodically reporting CSI-RS measurement results through an MN side in case that the SCG is in the deactivated state; or reporting CSI-RS measurement results through a pre-configured SCG resource in case that the SCG is in the deactivated state.

In an embodiment of the present application, the performing configuration associated with the RRM measurement and reporting in case that the SCG is in the deactivated state includes at least one of the followings:

performing the RRM measurement and reporting in case that the SCG is in the deactivated state;

performing relaxed RRM measurement in case that the SCG is in the deactivated state;

performing RRM measurement based on measurement configuration configured on an SCG side in case that the SCG is in the deactivated state; or performing relaxed RRM measurement based on measurement configuration configured on an SCG side in case that the SCG is in the deactivated state.

In an embodiment of the present application, the performing configuration associated with RLM measurement and RLF reporting in case that the SCG is in the deactivated state includes at least one of the followings:

performing RLM measurement in case that the SCG is in the deactivated state;

performing RLF reporting in case that the SCG is in the deactivated state; or performing RLM measurement and RLF reporting in case that the SCG is in the deactivated state.

In an embodiment of the present application, the performing configuration associated with the beam management in case that the SCG is in the deactivated state includes at least one of the followings:

performing PSCell beam measurement and reporting in case that the SCG is in the deactivated state;

performing PSCell beam failure detection in case that the SCG is in the deactivated state;

performing PSCell beam failure recovery in case that the SCG is in the deactivated state;

performing SCG SCell beam measurement and reporting in case that the SCG is in the deactivated state;

performing SCG SCell beam failure detection in case that the SCG is in the deactivated state; or performing SCG SCell beam failure recovery in case that the SCG is in the deactivated state.

In an embodiment of the present application, the performing configuration associated with SRS transmission in case that the SCG is in the deactivated state includes at least one of the followings:

performing SRS transmission in case that the SCG is in the deactivated state; or performing relaxed SRS transmission in case that the SCG is in the deactivated state.

In an embodiment of the present application, the performing configuration associated with maintaining the uplink TA value in case that the SCG is in the deactivated state includes at least one of the followings:

maintaining the uplink TA value in case that the SCG is in the deactivated state; or running a temporary uplink TAT in case that the SCG is in the deactivated state.

In an embodiment of the present application, the performing configuration for directly configuring the SCG to be in the deactivated state includes at least one of the followings:

upon performing SCG addition, configuring added SCG to be in the deactivated state directly;

upon performing SCG reconfiguration, configuring reconfigured SCG to be in the deactivated state directly;

upon performing conditional PSCell addition, configuring the SCG to be in the deactivated state directly;

upon performing PSCell change, configuring the SCG to be in the deactivated state directly;

upon reconfiguration with sync of PSCell, configuring the SCG to be in the deactivated state directly;

upon performing conditional PSCell change, configuring the SCG to be in the deactivated state directly;

upon performing RRC connection resume, configuring the SCG to be in the deactivated state directly;

upon performing PCell handover, configuring the SCG to be in the deactivated state directly; or upon reconfiguration with sync of PCell, configuring the SCG to be in the deactivated state directly.

In an embodiment of the present application, the performing configuration associated with reconfiguration in case that the SCG is in the deactivated state includes at least one of the followings:

performing SCell addition in case that the SCG is in the deactivated state;

performing SCell release in case that the SCG is in the deactivated state;

performing SCell reconfiguration in case that the SCG is in the deactivated state;

performing PSCell change in case that the SCG is in the deactivated state;

performing reconfiguration with sync of PSCell in case that the SCG is in the deactivated state;

performing conditional PSCell change in case that the SCG is in the deactivated state;

performing SCG release in case that the SCG is in the deactivated state;

performing PSCell reconfiguration in case that the SCG is in the deactivated state;

performing PCell handover in case that the SCG is in the deactivated state; or performing reconfiguration with sync of PCell in case that the SCG is in the deactivated state.

It should be noted here that the above-mentioned apparatus for processing the UE capability information according to the embodiments of the present application may implement all the method steps implemented by the above-mentioned method embodiments performed by the UE, and may achieve the same effect. The same parts and beneficial effects as the same method embodiments are not repeated in the present application.

Figure 6:
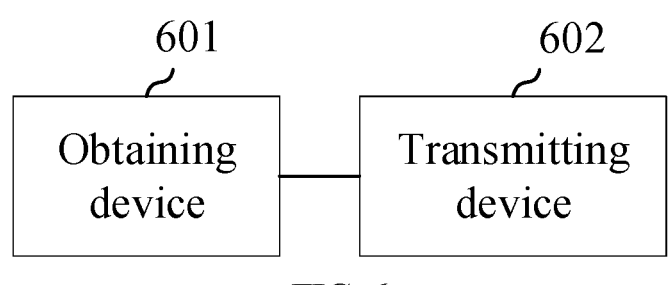
FIG. 6 is a second schematic structural diagram of an apparatus for processing UE capability information according to an embodiment of the present application.

FIG. 6 is a second schematic structural diagram of an apparatus for processing user equipment (UE) capability information according to an embodiment of the present application. As shown in FIG. 6, the apparatus for processing the UE capability information includes an obtaining device 601 and a transmitting device 602.

The obtaining device 601 is used to obtain first capability information reported from the UE, where the first capability information is UE capability information associated with a secondary cell group (SCG) deactivated state; and the transmitting device 602 is used to transmit first configuration information to the UE, where the first configuration information is used to indicate the UE to perform configuration associated with the SCG deactivated state.

In an embodiment of the present application, before obtaining first capability information reported from the UE, the method further includes:

transmitting a capability request message to the UE, where the capability request message includes first indication information for indicating the UE to report the first capability information.

It should be noted here that the above-mentioned apparatus for processing the UE capability information according to the embodiments of the present application may implement all the method steps implemented by the above-mentioned method embodiments performed by the network side device, and may achieve the same effect. The same parts and beneficial effects as the same method embodiments are not repeated in the present application.

It should be noted that, the division of units/devices in the embodiments of the present application is schematic, and is only a logical function division, and there may be other division manners in actual implementation. In addition, the functional units in the various embodiments of the present application may be integrated into one processing unit, or each unit may exist alone physically, or two or more units may be integrated into one unit. The above-mentioned integrated unit may be implemented in the form of hardware or software functional unit.

If the integrated unit is implemented in the form of a software functional unit and sold or used as an independent product, it may be stored in a processor readable storage medium. Based on such understanding, the solutions of the present application in essence or a part of the solutions that contributes to the prior art, or all or part of the solutions, may be embodied in the form of a software product, which is stored in a storage medium, including several instructions to cause a computer device (which may be a personal computer, server, or network side device, etc.) or a processor to perform all or part of the steps of the methods described in the respective embodiments of the present application. The storage medium described above includes various media that may store program codes such as USB flash disk, mobile hard disk, read-only memory (ROM), random access memory (RAM), magnetic disk, or a compact disk.

An embodiment of the present application provides a processor readable storage medium having stored thereon a computer program that cause a processor to perform the steps of the methods described above, which, for example, includes:

reporting first capability information to a network side device, where the first capability information is UE capability information associated with a secondary cell group (SCG) deactivated state;

receiving first configuration information transmitted from the network side device, where the first configuration information is used to indicate the UE to perform configuration associated with the SCG deactivated state; and performing the configuration associated with the SCG deactivated state; or obtaining first capability information reported from the UE, where the first capability information is UE capability information associated with a secondary cell group (SCG) deactivated state; and transmitting first configuration information to the UE, where the first configuration information is used to indicate the UE to perform configuration associated with the SCG deactivated state.

It should be noted that the processor readable storage medium may be any available medium or data storage device that may be accessed by the computer, including but not limited to, a magnetic storage (e.g., a floppy disk, a hard disk, a magnetic tape, a magneto-optical disk (MO), etc.), optical memory (such as CD, DVD, BD, HVD, etc.), and a semiconductor memory (such as ROM, EPROM, EEPROM, non-volatile memory (NAND FLASH), solid-state drive (SSD)), etc.

In addition, it should be noted that the term "and/or" in the embodiments of the present application describes a related relationship of associated objects, and indicates that there may be three kinds of relationships. For example, A and/or B may represent that A exists alone, A and B exist simultaneously, and B exists alone. Character "/" generally indicates that the associated objects have an "or" relationship.

In the embodiments of the present application, the term "multiple" refers to two or more than two, and other quantifiers are similar.

The solutions according to the embodiments of the present application may be applicable to various systems, especially 5G systems. For example, applicable systems may be a global system of mobile communication (GSM) system, a code division multiple access (CDMA) system, a wideband code division multiple access (WCDMA) general packet radio service (GPRS) system, a long term evolution (LTE) system, an LTE frequency division duplex (FDD) system, an LTE time division duplex (TDD) system, a long term evolution advanced (LTE-A) system, a universal mobile telecommunication system (UMTS), a worldwide interoperability for microwave access (WiMAX) system, a 5G new radio (NR) system, etc. These various systems include a user equipment and a network side device. The system may also include a core network, such as an evolved packet system (EPS), a 5G system (5GS), and the like.

The terminal in the embodiments of the present application may be a device that provides voice and/or data connectivity to a user, a handheld device with a wireless connection function, or other processing device connected to a wireless modem. In different systems, the names of the terminal may be different. For example, in the 5G system, the terminal may be called as a user equipment (UE). A wireless terminal may communicate with one or more core networks (CN) via a radio access network (RAN), and the wireless terminal may be a mobile terminal, such as a mobile phone or cellular phone and computers with mobile terminal, e.g., a portable mobile device, a pocket-sized mobile device, a hand-held mobile device, a computer-built mobile device or a vehicle-mounted mobile device, which exchange language and/or data with the radio access network. For example, a personal communication service (PCS) phone, a radio phone, a session initiated protocol (SIP) phone, a wireless local loop (WLL) station, a personal digital assistant (PDA) and other devices. A wireless terminal device may also be called a system, a subscriber unit, a subscriber station, a mobile station, a mobile, a remote station, an access point, a remote terminal, an access terminal, a user terminal, a user agent, and a user device, which are not limited in the embodiments of the present application.

The network side device in the embodiments of the present application may be a base station, and the base station may include cells providing services for the terminal. Depending on the specific application, the network side device may also be called an access point, or may be a device in the access network that communicates with wireless terminal through one or more sectors on the air interface, or other names. Network side device may be used to exchange received air frames with internet protocol (IP) packets, and act as a router between wireless terminal and the rest of the access network, and the rest of the access network may include an IP communication network. The network side devices may also coordinate attribute management for the air interface. For example, the network side device in the embodiments of the present application may be a base transceiver station (BTS) in a global system for mobile communications (GSM) or a code division multiple access (CDMA), may also be a node B in a wide-band code division multiple access (WCDMA), may also be an evolutional node B (eNB or e-Node B) in a long term evolution (LTE) system, a 5G base station (gNB) in 5G network architecture (next generation system), may also be a home evolved node B (HeNB), a relay node (relay node), a femto, a pico base station (pico), etc., which are not limited in the embodiments of the present application. In some network structures, a network side device may include a centralized unit (CU) node and a distributed unit (DU) node, and the centralized unit and the distributed unit may also be geographically separated.

Multi-input multi-output (MIMO) transmission may be performed between the network side device and the UE using one or more antennas and the MIMO transmission may be single user MIMO (SU-MIMO) or multiple user MIMO (MU-MIMO). Based on the form and number of antenna combinations, MIMO transmission may be 2D-MIMO, 3D-MIMO, FD-MIMO, or massive-MIMO, and may also be diversity transmission, precoding transmission, or beamforming transmission.

Embodiments of the present application may be provided as a method, system, or computer program product. Accordingly, the present application may take the form of an entirely hardware embodiment, an entirely software embodiment, or an embodiment combining software and hardware aspects. Furthermore, the present application may take the form of a computer program product embodied on one or more computer-usable storage media having computer-usable program code embodied therein, including but not limited to disk storage, optical storage, and the like.

The present application is described with reference to flow charts and/or block diagrams of methods, apparatus (systems), and computer program products according to embodiments of the present application. It will be understood that each flow and/or block in the flow charts and/or block diagrams, and combinations thereof may be implemented by computer-executable instructions. These computer-executable instructions may be provided to processors of a general purpose computer, a special purpose computer, an embedded processor or other programmable data processing device to produce a machine and the instructions executed by the processor of the computer or other programmable data processing device form a means for performing the functions specified in one or more flows in a flowchart and/or one or more blocks of a block diagram.

These processor-executable instructions may also be stored in a processor-readable memory capable of directing a computer or other programmable data processing apparatus to operate in a particular manner, and the instructions stored in the processor-readable memory may result in a manufacture including instruction means, the instruction means may perform the functions specified in one or more flows of the flowchart and/or one or more blocks of the block diagram.

These processor-executable instructions may also be loaded onto a computer or other programmable data processing device to cause a series of operational steps to be performed on the computer or other programmable device to produce a computer-implemented process and instructions performed on the computer or other programmable devices provide steps for performing the functions specified in one or more flows of the flowchart and/or one or more blocks of the block diagram.

What is claimed is:

1. A method for processing user equipment (UE) capability information, comprising:

reporting first capability information to a network side device, wherein the first capability information is UE capability information associated with a secondary cell group (SCG) deactivated state;

receiving first configuration information transmitted from the network side device, wherein the first configuration information is used to indicate the UE to perform configuration associated with the SCG deactivated state; and performing the configuration associated with the SCG deactivated state, wherein the first capability information comprises at least one of the followings:

whether the UE supports a capability associated with the SCG deactivated state;

whether the UE supports a capability associated with SCG state transition;

whether the UE supports a capability associated with performing channel state information reference signal (CSI-RS) measurement and reporting in case that the SCG is in a deactivated state;

whether the UE supports a capability associated with performing radio resource management (RRM) measurement and reporting in case that the SCG is in a deactivated state;

whether the UE supports a capability associated with performing radio link monitoring (RLM) measurement and radio link failure (RLF) reporting in case that the SCG is in a deactivated state;

whether the UE supports a capability associated with performing beam management in case that the SCG is in a deactivated state;

whether the UE supports a capability associated with performing sounding reference signal (SRS) transmission in case that the SCG is in a deactivated state;

whether the UE supports a capability associated with maintaining an uplink timing advance (TA) value in case that the SCG is in a deactivated state;

whether the UE supports a capability to directly configure the SCG to be in a deactivated state; or whether the UE supports a capability associated with performing reconfiguration in case that the SCG is in a deactivated state.

2. The method of claim 1, wherein the first capability information is distinguished by at least one of the followings:

bands supported by the UE;

band combinations supported by the UE;

duplex modes supported by the UE;

transmission frequency ranges supported by the UE;

types of radio access networks supported by the UE;

types of multi-connectivity network architectures supported by the UE;

types of radio access networks for a master node (MN) supported by the UE; or types of radio access networks for a secondary node (SN) supported by the UE.

3. The method of claim 1, wherein the first capability information comprises at least one type of indication information for the capability associated with SCG state transition, wherein the indication information comprises at least one of the followings:

whether the UE supports performing the SCG state transition through a medium access control layer control element (MAC CE);

whether the UE supports performing the SCG state transition through downlink control information (DCI);

whether the UE supports performing the SCG state transition through radio resource control (RRC); or whether the UE supports performing the SCG state transition through a timer.

4. The method of claim 1, wherein the first capability information comprises at least one type of indication information for the capability associated with performing CSI-RS measurement and reporting in case that the SCG is in the deactivated state, wherein the indication information comprises at least one of the followings:

whether the UE supports periodically reporting CSI-RS measurement results through an MN side in case that the SCG is in the deactivated state;

whether the UE supports semi-persistently reporting CSI-RS measurement results through an MN side in case that the SCG is in the deactivated state;

whether the UE supports aperiodically reporting CSI-RS measurement results through an MN side in case that the SCG is in the deactivated state; or whether the UE supports reporting CSI-RS measurement results through a pre-configured SCG resource in case that the SCG is in the deactivated state.

5. The method of claim 1, wherein the first capability information comprises at least one type of indication information for the capability associated with performing RRM measurement and reporting in case that the SCG is in the deactivated state, wherein the indication information comprises at least one of the followings:

whether the UE supports performing RRM measurement in case that the SCG is in the deactivated state;

whether the UE supports performing relaxed RRM measurement in case that the SCG is in the deactivated state;

whether the UE supports performing RRM measurement based on measurement configuration configured on an SCG side in case that the SCG is in the deactivated state; or whether the UE supports performing relaxed RRM measurement based on measurement configuration configured on an SCG side in case that the SCG is in the deactivated state.

6. The method of claim 1, wherein the first capability information comprises at least one type of indication information for the capability associated with performing RLM measurement and RLF reporting in case that the SCG is in the deactivated state, wherein the indication information comprises at least one of the followings:

whether the UE supports performing RLM measurement in case that the SCG is in the deactivated state;

whether the UE supports performing RLF reporting in case that the SCG is in the deactivated state; or whether the UE supports performing RLM measurement and RLF reporting in case that the SCG is in the deactivated state.

7. The method of claim 1, wherein the first capability information comprises at least one type of indication information for the capability associated with performing beam management in case that the SCG is in the deactivated state, wherein the indication information comprises at least one of the followings:

whether the UE supports performing primary secondary cell (PSCell) beam measurement and reporting in case that the SCG is in the deactivated state;

whether the UE supports performing PSCell beam failure detection in case that the SCG is in the deactivated state;

whether the UE supports performing PSCell beam failure recovery in case that the SCG is in the deactivated state;

whether the UE supports performing SCG secondary cell (SCell) beam measurement and reporting in case that the SCG is in the deactivated state;

whether the UE supports performing SCG SCell beam failure detection in case that the SCG is in the deactivated state; or whether the UE supports performing SCG SCell beam failure recovery in case that the SCG is in the deactivated state.

8. The method of claim 1, wherein the first capability information comprises at least one type of indication information for the capability associated with performing SRS transmission in case that the SCG is in the deactivated state, wherein the indication information comprises at least one of the followings:

whether the UE supports performing SRS transmission in case that the SCG is in the deactivated state; or whether the UE supports performing relaxed SRS transmission in case that the SCG is in the deactivated state.

9. The method of claim 1, wherein the first capability information comprises at least one type of indication information for the capability associated with maintaining the uplink TA value in case that the SCG is in the deactivated state, wherein the indication information comprises at least one of the followings:

whether the UE supports maintaining the uplink TA value in case that the SCG is in the deactivated state; or whether the UE supports running a temporary uplink timing advance timer (TAT) in case that the SCG is in the deactivated state.

10. The method of claim 1, wherein the first capability information comprises at least one type of indication information for the capability to directly configure the SCG to be in the deactivated state, wherein the indication information comprises at least one of the followings:

whether the UE supports directly configuring the SCG to be in the deactivated state in case of performing SCG addition;

whether the UE supports directly configuring the SCG to be in the deactivated state in case of performing SCG reconfiguration;

whether the UE supports directly configuring the SCG to be in the deactivated state in case of performing conditional PSCell addition;

whether the UE supports directly configuring the SCG to be in the deactivated state in case of performing PSCell change;

whether the UE supports directly configuring the SCG to be in the deactivated state in case of performing reconfiguration with sync of PSCell;

whether the UE supports directly configuring the SCG to be in the deactivated state in case of performing conditional PSCell change;

whether the UE supports directly configuring the SCG to be in the deactivated state in case of performing RRC connection resume;

whether the UE supports directly configuring the SCG to be in the deactivated state in case of performing primary cell (PCell) handover; or whether the UE supports directly configuring the SCG to be in the deactivated state in case of performing reconfiguration with sync of PCell.

11. The method of claim 1, wherein the first capability information comprises at least one type of indication information for the capability associated with performing reconfiguration in case that the SCG is in the deactivated state, wherein the indication information comprises at least one of the followings:

whether the UE supports performing SCell addition in case that the SCG is in the deactivated state;

whether the UE supports performing SCell release in case that the SCG is in the deactivated state;

whether the UE supports performing SCell reconfiguration in case that the SCG is in the deactivated state;

whether the UE supports performing PSCell change in case that the SCG is in the deactivated state;

whether the UE supports performing reconfiguration with sync of PSCell in case that the SCG is in the deactivated state;

whether the UE supports performing conditional PSCell change in case that the SCG is in the deactivated state;

whether the UE supports performing SCG release in case that the SCG is in the deactivated state;

whether the UE supports performing SCG reconfiguration in case that the SCG is in the deactivated state;

whether the UE supports performing PCell handover in case that the SCG is in the deactivated state; or whether the UE supports performing reconfiguration with sync of PCell in case that the SCG is in the deactivated state.

12. The method of claim 1, wherein the performing the configuration associated with the SCG deactivated state comprises at least one of the followings:

configuring the SCG to be in the deactivated state;

configuring a state transition of the SCG;

performing configuration associated with CSI-RS measurement and reporting in case that the SCG is in the deactivated state;

performing configuration associated with RRM measurement and reporting in case that the SCG is in the deactivated state;

performing configuration associated with RLM measurement and RLF reporting in case that the SCG is in the deactivated state;

performing configuration associated with beam management in case that the SCG is in the deactivated state;

performing configuration associated with SRS transmission in case that the SCG is in the deactivated state;

performing configuration associated with maintaining an uplink TA value in case that the SCG is in the deactivated state;

performing configuration for directly configuring the SCG to be the deactivated state; or performing configuration associated with reconfiguration in case that the SCG is in the deactivated state.

13. The method of claim 12, wherein the configuring the state transition of the SCG comprises at least one of the followings:

configuring the state of the SCG to transition from an activated state to a deactivated state; or configuring the state of the SCG to transition from a deactivated state to an activated state;

wherein the first configuration information comprises at least one of the followings:

medium access control layer control element (MAC CE);

downlink control information (DCI);

radio resource control (RRC); or the configuring the state transition of the SCG comprises: starting a first timer, and configuring the state of the SCG to transition from a deactivated state to an activated state; or starting a second timer, and configuring the state of the SCG to transition from an activated state to a deactivated state; or the performing configuration associated with CSI-RS measurement and reporting in case that the SCG is in the deactivated state comprises at least one of the followings: periodically reporting CSI-RS measurement results through an MN side in case that the SCG is in the deactivated state; semi-persistently reporting CSI-RS measurement results through an MN side in case that the SCG is in the deactivated state; aperiodically reporting CSI-RS measurement results through an MN side in case that the SCG is in the deactivated state; or reporting CSI-RS measurement results through a pre-configured SCG resource in case that the SCG is in the deactivated state; or the performing configuration associated with RRM measurement and reporting in case that the SCG is in the deactivated state comprises at least one of the followings: performing RRM measurement and reporting in case that the SCG is in the deactivated state; performing relaxed RRM measurement in case that the SCG is in the deactivated state; performing RRM measurement based on measurement configuration configured on an SCG side in case that the SCG is in the deactivated state; or performing relaxed RRM measurement based on measurement configuration configured on an SCG side in case that the SCG is in the deactivated state; or the performing configuration associated with RLM measurement and RLF reporting in case that the SCG is in the deactivated state comprises at least one of the followings: performing RLM measurement in case that the SCG is in the deactivated state; performing RLF reporting in case that the SCG is in the deactivated state; or performing RLM measurement and RLF reporting in case that the SCG is in the deactivated state; or the performing configuration associated with beam management in case that the SCG is in the deactivated state comprises at least one of the followings: performing PSCell beam measurement and reporting in case that the SCG is in the deactivated state; performing PSCell beam failure detection in case that the SCG is in the deactivated state; performing PSCell beam failure recovery in case that the SCG is in the deactivated state; performing SCG secondary cell (SCell) beam measurement and reporting in case that the SCG is in the deactivated state; performing SCG SCell beam failure detection in case that the SCG is in the deactivated state; or performing SCG SCell beam failure recovery in case that the SCG is in the deactivated state; or the performing configuration associated with SRS transmission in case that the SCG is in the deactivated state comprises at least one of the followings: performing SRS transmission in case that the SCG is in the deactivated state; or performing relaxed SRS transmission in case that the SCG is in the deactivated state; or the performing configuration associated with maintaining uplink TA value in case that the SCG is in the deactivated state comprises at least one of the followings: maintaining the uplink TA value in case that the SCG is in the deactivated state; or running a temporary uplink TAT in case that the SCG is in the deactivated state; or the performing configuration for directly configuring the SCG to be in the deactivated state comprises at least one of the followings: upon performing SCG addition, configuring added SCG to be in the deactivated state directly; upon performing SCG reconfiguration, configuring reconfigured SCG to be in the deactivated state directly; upon performing conditional PSCell addition, configuring the SCG to be in the deactivated state directly; upon performing PSCell change, configuring the SCG to be in the deactivated state directly; upon reconfiguration with sync of PSCell, configuring the SCG to be in the deactivated state directly; upon performing conditional PSCell change, configuring the SCG to be in the deactivated state directly; upon performing RRC connection resume, configuring the SCG to be in the deactivated state directly; upon performing PCell handover, configuring the SCG to be in the deactivated state directly; or upon reconfiguration with sync of PCell, configuring the SCG to be in the deactivated state directly; or the performing configuration associated with reconfiguration in case that the SCG is in the deactivated state comprises at least one of the followings: performing SCell addition in case that the SCG is in the deactivated state; performing SCell release in case that the SCG is in the deactivated state; performing SCell reconfiguration in case that the SCG is in the deactivated state; performing PSCell change in case that the SCG is in the deactivated state; performing reconfiguration with sync of PSCell in case that the SCG is in the deactivated state; performing conditional PSCell change in case that the SCG is in the deactivated state; performing SCG release in case that the SCG is in the deactivated state; performing PSCell reconfiguration in case that the SCG is in the deactivated state; performing PCell handover in case that the SCG is in the deactivated state; or performing reconfiguration with sync of PCell in case that the SCG is in the deactivated state.

14. A method for processing user equipment (UE) capability information, comprising:

obtaining first capability information reported from the UE, wherein the first capability information is UE capability information associated with a secondary cell group (SCG) deactivated state; and transmitting first configuration information to the UE, wherein the first configuration information is used to indicate the UE to perform configuration associated with the SCG deactivated state:

wherein the first capability information comprises at least one of the followings:

whether the UE supports a capability associated with the SCG deactivated state;

whether the UE supports a capability associated with SCG state transition;

whether the UE supports a capability associated with performing channel state information reference signal (CSI-RS) measurement and reporting in case that the SCG is in a deactivated state;

whether the UE supports a capability associated with performing radio resource management (RRM) measurement and reporting in case that the SCG is in a deactivated state;

whether the UE supports a capability associated with performing radio link monitoring (RLM) measurement and radio link failure (RLF) reporting in case that the SCG is in a deactivated state;

whether the UE supports a capability associated with performing beam management in case that the SCG is in a deactivated state;

whether the UE supports a capability associated with performing sounding reference signal (SRS) transmission in case that the SCG is in a deactivated state;

whether the UE supports a capability associated with maintaining an uplink timing advance (TA) value in case that the SCG is in a deactivated state;

whether the UE supports a capability to directly configure the SCG to be in a deactivated state; or whether the UE supports a capability associated with performing reconfiguration in case that the SCG is in a deactivated state.

15. A user equipment (UE), comprising:

a memory storing a computer program;

a processor; and a transceiver for transmitting and receiving data under a control of the processor, wherein the computer program, when executed by the processor, causes the UE to perform the following operations of:

reporting first capability information to a network side device, wherein the first capability information is UE capability information associated with a secondary cell group (SCG) deactivated state;

receiving first configuration information transmitted from the network side device, wherein the first configuration information is used to indicate the UE to perform configuration associated with the SCG deactivated state; and performing the configuration associated with the SCG deactivated state;

wherein the first capability information comprises at least one of the followings:

whether the UE supports a capability associated with the SCG deactivated state;

whether the UE supports a capability associated with SCG state transition;

whether the UE supports a capability associated with performing channel state information reference signal (CSI-RS) measurement and reporting in case that the SCG is in a deactivated state;

whether the UE supports a capability associated with performing radio resource management (RRM) measurement and reporting in case that the SCG is in a deactivated state;

whether the UE supports a capability associated with performing radio link monitoring (RLM) measurement and radio link failure (RLF) reporting in case that the SCG is in a deactivated state;

whether the UE supports a capability associated with performing beam management in case that the SCG is in a deactivated state;

whether the UE supports a capability associated with performing sounding reference signal (SRS) transmission in case that the SCG is in a deactivated state;

whether the UE supports a capability associated with maintaining an uplink timing advance (TA) value in case that the SCG is in a deactivated state;

whether the UE supports a capability to directly configure the SCG to be in a deactivated state; or whether the UE supports a capability associated with performing reconfiguration in case that the SCG is in a deactivated state.

16. The UE of claim 15, wherein the first capability information is distinguished by at least one of the followings:

bands supported by the UE;

band combinations supported by the UE;

duplex modes supported by the UE;

transmission frequency ranges supported by the UE;

types of radio access networks supported by the UE;

types of multi-connectivity network architectures supported by the UE;

types of radio access networks for a master node (MN) supported by the UE; or types of radio access networks for a secondary node (SN) supported by the UE.

17. The UE of claim 15, wherein the first capability information comprises at least one type of indication information for the capability associated with SCG state transition, wherein the indication information comprises at least one of the followings:

whether the UE supports performing the SCG state transition through a medium access control layer control element (MAC CE);

whether the UE supports performing the SCG state transition through downlink control information (DCI);

whether the UE supports performing the SCG state transition through radio resource control (RRC);

whether the UE supports performing the SCG state transition through a timer.

18. The UE of claim 15, wherein the first capability information comprises at least one type of indication information for the capability associated with performing CSI-RS measurement and reporting in case that the SCG is in the deactivated state, wherein the indication information comprises at least one of the followings:

whether the UE supports periodically reporting CSI-RS measurement results through an MN side in case that the SCG is in the deactivated state;

whether the UE supports semi-persistently reporting CSI-RS measurement results through an MN side in case that the SCG is in the deactivated state;

whether the UE supports aperiodically reporting CSI-RS measurement results through an MN side in case that the SCG is in the deactivated state; or whether the UE supports reporting CSI-RS measurement results through a pre-configured SCG resource in case that the SCG is in the deactivated state.

19. The UE of claim 15, wherein the first capability information comprises at least one type of indication information for the capability associated with performing RRM measurement and reporting in case that the SCG is in the deactivated state, wherein the indication information comprises at least one of the followings:

whether the UE supports performing RRM measurement in case that the SCG is in the deactivated state;

whether the UE supports performing relaxed RRM measurement in case that the SCG is in the deactivated state;

whether the UE supports performing RRM measurement based on measurement configuration configured on an SCG side in case that the SCG is in the deactivated state; or whether the UE supports performing relaxed RRM measurement based on measurement configuration configured on an SCG side in case that the SCG is in the deactivated state.

20. The UE of claim 15, wherein the first capability information comprises at least one type of indication information for the capability associated with performing RLM measurement and RLF reporting in case that the SCG is in the deactivated state, wherein the indication information comprises at least one of the followings:

whether the UE supports performing RLM measurement in case that the SCG is in the deactivated state;

whether the UE supports performing RLF reporting in case that the SCG is in the deactivated state; or whether the UE supports performing RLM measurement and RLF reporting in case that the SCG is in the deactivated state.

21. The UE of claim 15, wherein the first capability information comprises at least one type of indication information for the capability associated with performing beam management in case that the SCG is in the deactivated state, wherein the indication information comprises at least one of the followings:

whether the UE supports performing primary secondary cell (PSCell) beam measurement and reporting in case that the SCG is in the deactivated state;

whether the UE supports performing PSCell beam failure detection in case that the SCG is in the deactivated state;

whether the UE supports performing PSCell beam failure recovery in case that the SCG is in the deactivated state;

whether the UE supports performing SCG secondary cell (SCell) beam measurement and reporting in case that the SCG is in the deactivated state;

whether the UE supports performing SCG SCell beam failure detection in case that the SCG is in the deactivated state; or whether the UE supports performing SCG SCell beam failure recovery in case that the SCG is in the deactivated state.

22. The UE of claim 15, wherein the first capability information comprises at least one type of indication information for the capability associated with performing SRS transmission in case that the SCG is in the deactivated state, wherein the indication information comprises at least one of the followings:

whether the UE supports performing SRS transmission in case that the SCG is in the deactivated state; or whether the UE supports performing relaxed SRS transmission in case that the SCG is in the deactivated state.

23. The UE of claim 15, wherein the first capability information comprises at least one type of indication information for the capability associated with maintaining the uplink TA value in case that the SCG is in the deactivated state, wherein the indication information comprises at least one of the followings:

whether the UE supports maintaining the uplink TA value in case that the SCG is in the deactivated state; or whether the UE supports running a temporary uplink timing advance timer (TAT) in case that the SCG is in the deactivated state.

24. The method of claim 15, wherein the first capability information comprises at least one type of indication information for the capability to directly configure the SCG to be in the deactivated state, wherein the indication information comprises at least one of the followings:

whether the UE supports directly configuring the SCG to be in the deactivated state in case of performing SCG addition;

whether the UE supports directly configuring the SCG to be in the deactivated state in case of performing SCG reconfiguration;

whether the UE supports directly configuring the SCG to be in the deactivated state in case of performing conditional PSCell addition;

whether the UE supports directly configuring the SCG to be in the deactivated state in case of performing PSCell change;

whether the UE supports directly configuring the SCG to be in the deactivated state in case of performing reconfiguration with sync of PSCell;

whether the UE supports directly configuring the SCG to be in the deactivated state in case of performing conditional PSCell change;

whether the UE supports directly configuring the SCG to be in the deactivated state in case of performing RRC connection resume;

whether the UE supports directly configuring the SCG to be in the deactivated state in case of performing primary cell (PCell) handover; or whether the UE supports directly configuring the SCG to be in the deactivated state in case of performing reconfiguration with sync of PCell.

25. The UE of claim 15, wherein the first capability information comprises at least one type of indication information for the capability associated with performing reconfiguration in case that the SCG is in the deactivated state, wherein the indication information comprises at least one of the followings:

whether the UE supports performing SCell addition in case that the SCG is in the deactivated state;

whether the UE supports performing SCell release in case that the SCG is in the deactivated state;

whether the UE supports performing SCell reconfiguration in case that the SCG is in the deactivated state;

whether the UE supports performing PSCell change in case that the SCG is in the deactivated state;

whether the UE supports performing reconfiguration with sync of PSCell in case that the SCG is in the deactivated state;

whether the UE supports performing conditional PSCell change in case that the SCG is in the deactivated state;

whether the UE supports performing SCG release in case that the SCG is in the deactivated state;

whether the UE supports performing SCG reconfiguration in case that the SCG is in the deactivated state;

whether the UE supports performing PCell handover in case that the SCG is in the deactivated state; or whether the UE supports performing reconfiguration with sync of PCell in case that the SCG is in the deactivated state.

26. A network side device, comprising:

a memory storing a computer program;

a processor; and a transceiver for transmitting and receiving data under a control of the processor, wherein the computer program, when executed by the processor, causes the network side device to perform the following operations of:

obtaining first capability information reported from the UE, wherein the first capability information is UE capability information associated with a secondary cell group (SCG) deactivated state; and transmitting first configuration information to the UE, wherein the first configuration information is used to indicate the UE to perform configuration associated with the SCG deactivated state;

wherein the first capability information comprise s at least one of the followings:

whether the UE supports a capability associated the SCG deactivated state;

whether the UE supports a capability associated with SCG state transition;

whether the UE supports a capability associated with performing channel state information reference signal (CSI-RS) measurement and reporting in case that the SCG is in a deactivated state;

whether the UE supports a capability associated with performing radio resource management (RRM) measurement and reporting in case that the SCG is in a deactivated state;

whether the UE supports a capability associated with performing radio link monitoring (RLM) measurement and radio link failure (RLF) reporting in case that the SCG is in a deactivated state;

whether the UE supports a capability associated with performing beam management in case that the SCG is in a deactivated state;

whether the UE supports a capability associated with performing sounding reference signal (SRS) transmission in case that the SCG is in a deactivated state;

whether the UE supports a capability associated with maintaining an uplink timing advance (TA) value in case that the SCG is in a deactivated state;

whether the UE supports a capability to directly configure the SCG to be in a deactivate state; or whether the UE supports a capability associated with performing reconfiguration in case that the SCG is in a deactivated state.

* * * * *